(12) United States Patent
Mitsuki

(10) Patent No.: US 7,212,349 B2
(45) Date of Patent: May 1, 2007

(54) ZOOM LENS SYSTEM

(75) Inventor: Shinichi Mitsuki, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 11/389,235

(22) Filed: Mar. 27, 2006

(65) Prior Publication Data
US 2007/0002462 A1    Jan. 4, 2007

(30) Foreign Application Priority Data
Mar. 31, 2005  (JP)  ............... 2005-102762

(51) Int. Cl.
*G02B 15/14*  (2006.01)
(52) U.S. Cl. ............... 359/682; 359/557; 359/689; 359/716; 359/740; 359/784
(58) Field of Classification Search ............... 359/557, 359/680–685, 689, 716, 740, 784, 781, 782
See application file for complete search history.

(56) References Cited

U.S. PATENT DOCUMENTS

| | | | |
|---|---|---|---|
| 5,969,881 A | 10/1999 | Konno | |
| 6,496,310 B2* | 12/2002 | Fujimoto | 359/680 |
| 6,597,513 B2 | 7/2003 | Minefuji | |
| 7,016,118 B2* | 3/2006 | Wada | 359/680 |

FOREIGN PATENT DOCUMENTS

| | | |
|---|---|---|
| JP | 10-161024 | 6/1998 |
| JP | 10-161024 A | 6/1998 |
| JP | 2002-277740 | 9/2002 |
| JP | 2002-277740 A | 9/2002 |

* cited by examiner

*Primary Examiner*—Evelyn A. Lester
(74) *Attorney, Agent, or Firm*—Miles & Stockbridge P.C.

(57) ABSTRACT

Providing a compact zoom lens system having high optical performance suitable for an electronic imaging device with a large number of pixels. The zoom lens system includes, in order from an object, a first lens group having negative refractive power, a second lens group having positive refractive power, and a third lens group having positive refractive power. When zooming from a wide-angle end state to a telephoto end state, the first lens group and the second lens group are moved such that a distance between the first lens group and the second lens group decreases, and a distance between the second lens group and the third lens group increases. The second lens group is composed of at least two positive lens elements and one negative lens element. At least one positive lens element and the negative lens element in the second lens group satisfy given conditional expressions.

21 Claims, 16 Drawing Sheets

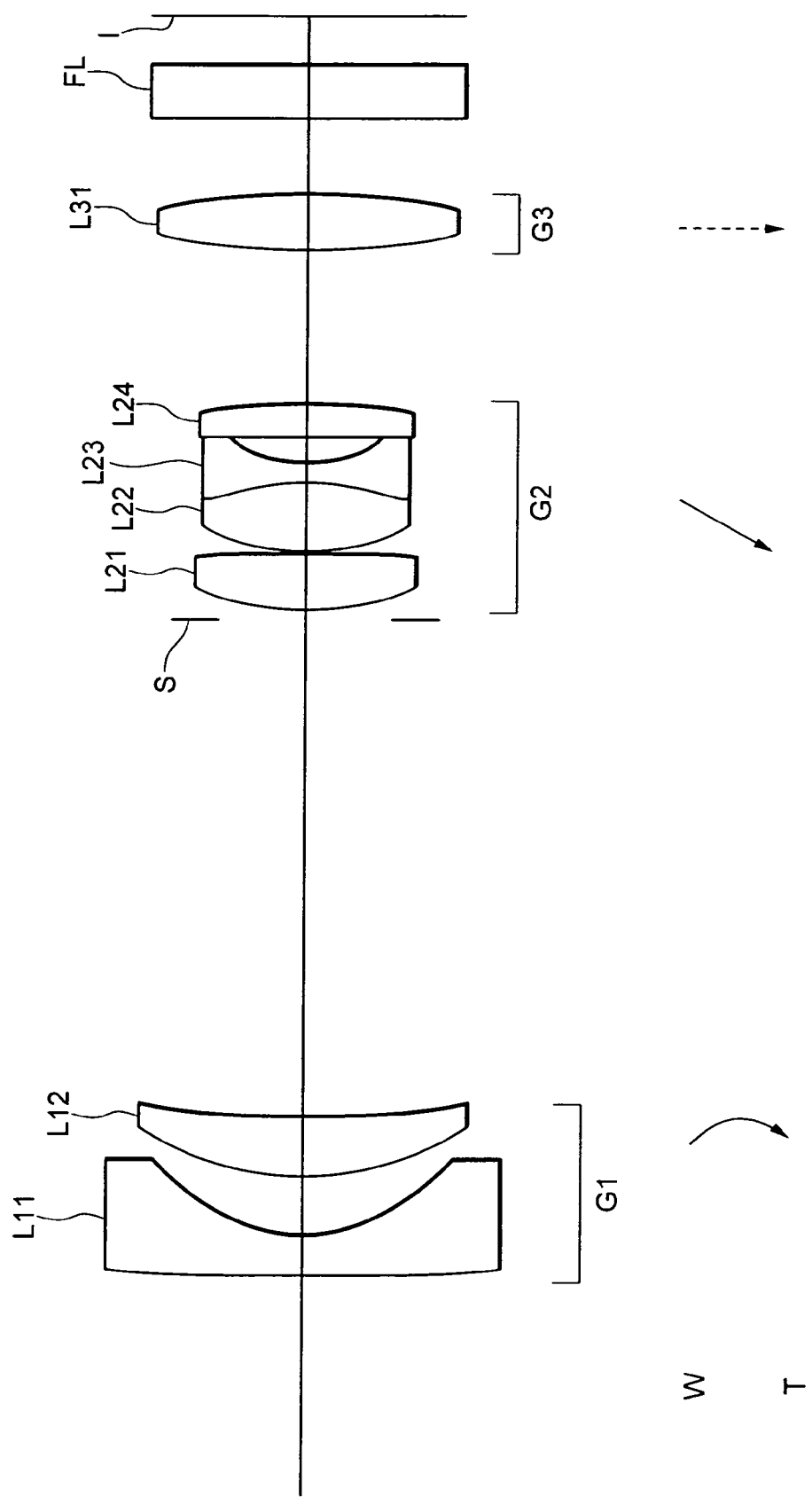

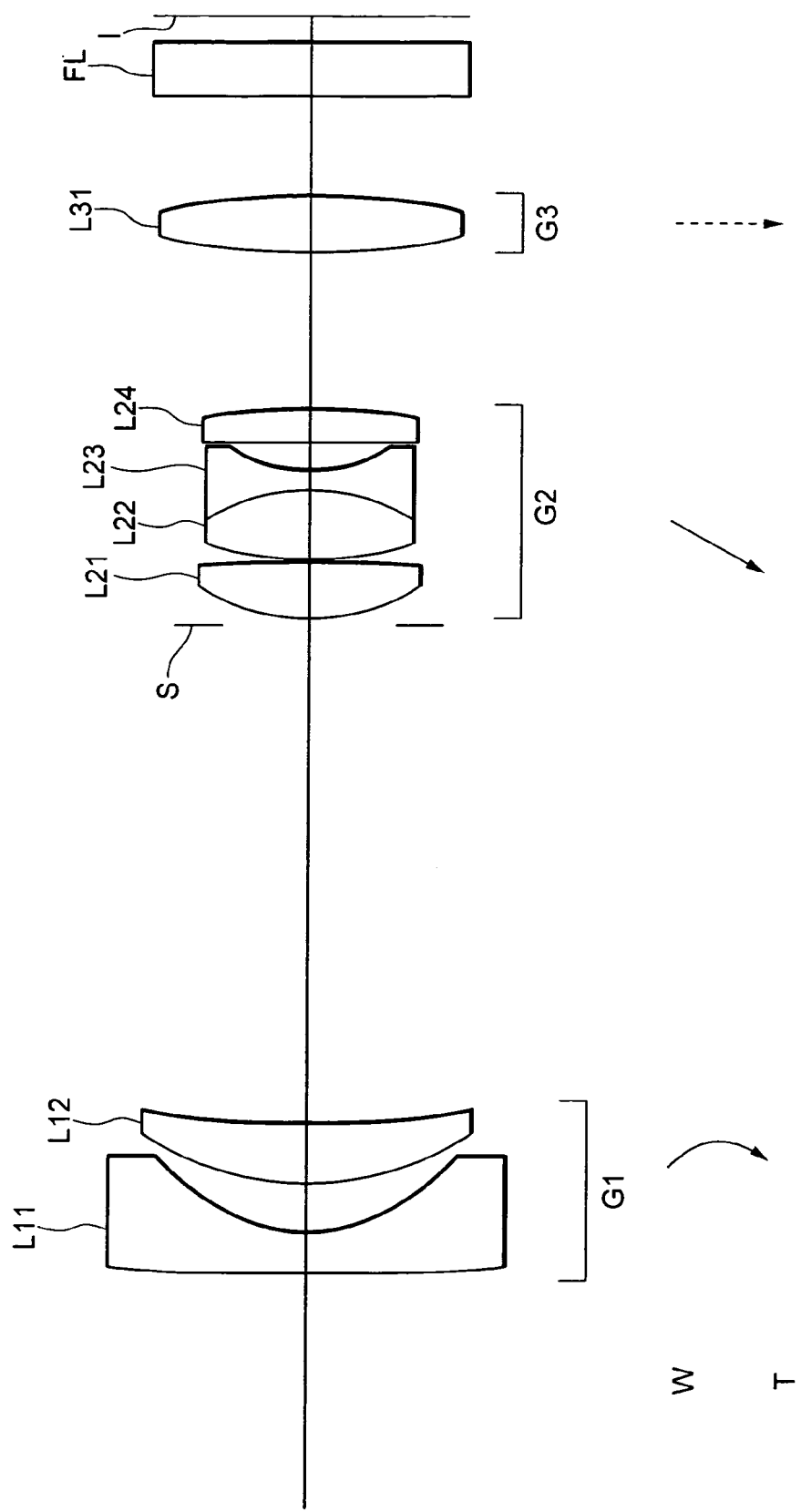

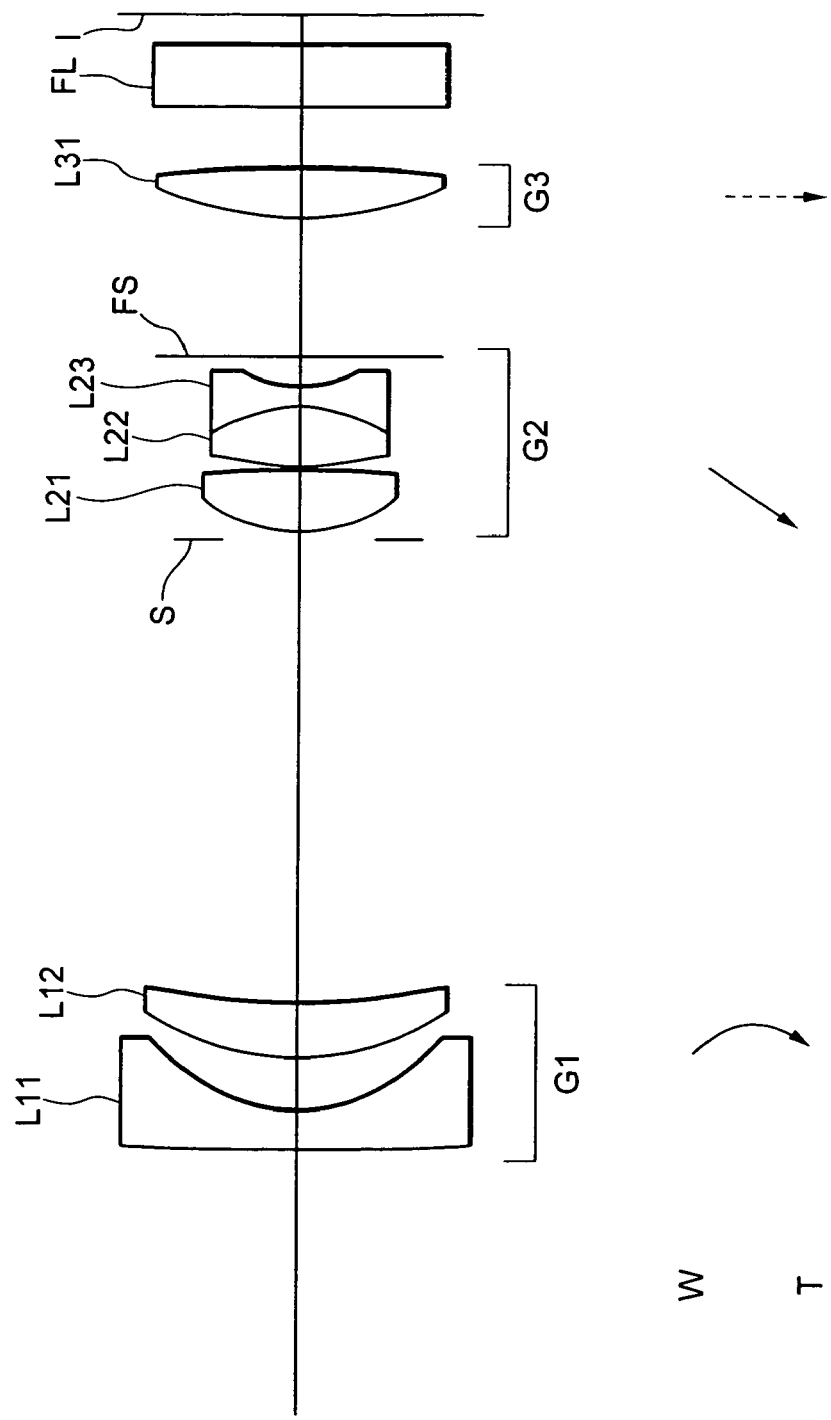

ial Application No. 2005-102762 filed on Mar. 31, 2005 is omitted as priority.

ZOOM LENS SYSTEM

The disclosure of the following priority application is herein incorporated by reference:

Japanese Patent Application No. 2005-102762 filed on Mar. 31, 2005.

BACKGROUND OF THE INVENTION

1. Field of the Invention

The present invention relates to a zoom lens system and in particular to a zoom lens system suitable for a digital still camera, and the like using an electronic imaging device.

2. Related Background Art

Recently, a digital still camera has been widespread in which an image of an object formed on an electronic imaging device is output in the form of an electric signal and recorded in the form of a digital image. In the electronic imaging device, with increasing degree of miniaturization and integration, electronic imaging devices with a larger number of pixels have been provided. Accordingly, in a shooting optical system, higher optical performance suitable for an imaging device with a large number of pixels has been desired. At the same time, in view of portability and convenience for a camera, a compact zoom lens has been desired as a shooting optical system. Moreover, in order to correct a camera shake which is a possible cause of terribly deteriorating resolution upon shooting, a zoom lens with a vibration reduction function has been desired as a shooting optical system.

Under these circumstances, a zoom lens system is proposed that is suitable for a digital still camera and the like using an electronic imaging device in Japanese Patent Application Laid-Open No. 2002-277740. The zoom lens system is composed of, in order from an object, a first lens group having negative refractive power, a second lens group having positive refractive power, and a third lens group having positive refractive power. When zooming from a wide-angle end state to a telephoto end state, the first lens group and the second lens group are moved such that a distance between the first lens group and the second lens group decreases, and a distance between the second lens group and the third lens group increases.

Moreover, as a zoom lens system with a vibration reduction function to correct a camera shake upon shooting, a zoom lens system has been proposed in Japanese Patent Application Laid-Open No. 10-161024, in which a portion of a lens group composing the zoom lens system is moved in a direction perpendicular to the optical axis to correct variation in an imaging position caused by a camera shake.

As described above, with increasing degree of miniaturization of an electronic imaging device in recent years, optical performance desired to a shooting optical system becomes higher. For example, chromatic aberration generated in a shooting optical system becomes a blurred color spread over few pixels to ten-odd pixels in a digital image generated after imaging an object on the imaging device resulting in deterioration of resolution.

However, in a so-called negative-leading type zoom lens system in which a lens group having negative refractive power is disposed as the most object side lens group, when the zoom lens system is made to be a high zoom ratio with securing compactness, generation of chromatic aberration upon zooming becomes conspicuous. In particular, when the zoom lens system is made to be compact with retracting the system to be accommodated in a camera body, since the thickness of each lens group is made thinner as much as possible, the number of lens elements has to be reduced, so that it becomes impossible to sufficiently correct aberrations.

In the zoom lens system disclosed in Japanese Patent Application Laid-Open No. 2002-277740, longitudinal chromatic aberration in the telephoto end state and lateral chromatic aberration in the wide-angle end state are large, so that the zoom lens system cannot sufficiently correspond to miniaturization of the imaging device.

On the other hand, when the imaging device is forcibly made to be miniaturized, a received light amount of each pixel becomes low resulting in lowering the sensitivity. Accordingly, in order to compensate for the lowered sensitivity, exposure time upon shooting has to be long, so that it tends to generate a camera shake and the like.

As described above, in the zoom lens system with a vibration reduction function, a portion of a lens group composing the zoom lens system is moved in a direction perpendicular to the optical axis as a vibration reduction lens group to correct a camera shake upon shooting. Accordingly, when the vibration reduction lens group is moved in a direction perpendicular to the optical axis, in other words, when the vibration reduction lens group is decentered, in order not to generate decentering aberration, chromatic aberration and spherical aberration of the vibration reduction lens group have to be corrected. Accordingly, in a zoom lens system with a vibration reduction function, the number of lens elements becomes large, so that the zoom lens system becomes large.

In the zoom lens system disclosed in Japanese Patent Application Laid-Open No. 10-161024, a front lens group in a second lens group is made to be a vibration reduction lens group. However, in spite of a small zoom ratio, deterioration in optical performance is large upon decentering the vibration reduction lens group for correcting a camera shake.

SUMMARY OF THE INVENTION

The present invention is made in view of the aforementioned problems and has an object to provide a compact zoom lens system with high optical performance suitable for an electronic imaging device with a large number of pixels.

According to a first aspect of the present invention, there is provided a zoom lens system including, in order from an object along an optical axis, a first lens group having negative refractive power, a second lens group having positive refractive power, and a third lens group having positive refractive power. When a state of lens group positions varies from a wide-angel end state to a telephoto end state, the first lens group and the second lens group are moved such that a distance between the first lens group and the second lens group decreases, and a distance between the second lens group and the third lens group increases. The second lens group is composed of at least two positive lens elements and one negative lens element. At least one positive lens element and the negative lens element in the second lens group satisfy the following conditional expressions (1) and (2):

$$\theta gF2p > 0.64 - 0.0016 \cdot vd2p \quad (1)$$

$$\theta gF2n < 0.64 - 0.0016 \cdot vd2n \quad (2)$$

where $\theta gF2p$ denotes a partial dispersion ratio of a material of the at least one positive lens element in the second lens group, $vd2p$ denotes Abbe number of the material of the at least one positive lens element in the second lens group at d-line (wavelength $\lambda$=587.6 nm), $\theta gF2n$ denotes a partial dispersion ratio of a material of the negative lens element in the second lens group, and νd2n denotes Abbe number of the material of the negative lens element in the second lens group at d-line (wavelength λ=587.6 nm).

In the first aspect of the present invention, at least one lens surface in the second lens group is preferably an aspherical surface.

In the first aspect of the present invention, it is preferable that the first lens group is composed of two lens elements that are, in order from the object along the optical axis, a negative lens element and a positive lens element, the negative lens element in the first lens group has an aspherical surface, and the following conditional expression (3) is preferably satisfied:

$$0.55 < (\nu d1n - \nu d1p)/\nu d1p < 1.2 \quad (3)$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

In the first aspect of the present invention, it is preferable that an aperture stop is disposed in the vicinity of the second lens group or in the second lens group.

According to a second aspect of the present invention, there is provided a zoom lens system including, in order from an object along an optical axis, a first lens group having negative refractive power, a second lens group having positive refractive power, and a third lens group having positive refractive power. When a state of lens group positions varies from a wide-angel end state to a telephoto end state, the first lens group and the second lens group being moved such that a distance between the first lens group and the second lens group decreases, and a distance between the second lens group and the third lens group increases. The second lens group has a vibration reduction function that corrects variation in an imaging position caused by a camera shake by moving the second lens group in a direction substantially perpendicular to the optical axis. The following conditional expression (4) is satisfied:

$$1.8 < (1-\beta 2T) \cdot \beta 3T < 2.4 \quad (4)$$

where β2T denotes imaging magnification of the second lens group in the telephoto end state, and β3T denotes imaging magnification of the third lens group in the telephoto end state.

In the second aspect of the present invention, it is preferable that the second lens group is composed of at least two positive lens elements and one negative lens element. At least one positive lens element and the negative lens element in the second lens group preferably satisfy the following conditional expressions (1) and (2):

$$\theta gF2p > 0.64 - 0.0016 \cdot \nu d2p$$

$$\theta gF2n < 0.64 - 0.0016 \cdot \nu d2n$$

where θgF2p denotes a partial dispersion ratio of a material of the at least one positive lens element in the second lens group, νd2p denotes Abbe number of the material of the at least one positive lens element in the second lens group at d-line (wavelength λ=587.6 nm), θgF2n denotes a partial dispersion ratio of a material of the negative lens element in the second lens group, and νd2n denotes Abbe number of the material of the negative lens element in the second lens group at d-line (wavelength λ=587.6 nm).

In the second aspect of the present invention, it is preferable that at least one lens surface in the second lens group is an aspherical surface.

In the second aspect of the present invention, it is preferable that the first lens group is composed of two lens elements that are, in order from the object along the optical axis, a negative lens element and a positive lens element. The negative lens element in the first lens group preferably has an aspherical surface, and the following conditional expression (3) is preferably satisfied:

$$0.55 < (\nu d1n - \nu d1p)/\nu d1p < 1.2 \quad (3)$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

According to a third aspect of the present invention, there is provided a method for forming an image of an object and varying a focal length of a zoom lens system that includes, in order from the object, a first lens group having negative refractive power, a second lens group having positive refractive power, and a third lens group having positive refractive power, including steps of varying a focal length of the zoom lens system from a wide-angle end state to a telephoto end state by moving the first lens group and the second lens group such that a distance between the first lens group and the second lens group decreases, and a distance between the second lens group and the third lens group increases, constructing the second lens group by at least two positive lens elements and one negative lens element, and satisfying the following conditional expressions (1) and (2) with at least one positive lens element and the negative lens element in the second lens group:

$$\theta gF2p > 0.64 - 0.0016 \cdot \nu d2p \quad (1)$$

$$\theta gF2n < 0.64 - 0.0016 \cdot \nu d2n \quad (2)$$

where θgF2p denotes a partial dispersion ratio of a material of the at least one positive lens element in the second lens group, νd2p denotes Abbe number of the material of the at least one positive lens element in the second lens group at d-line (wavelength λ=587.6 nm), θgF2n denotes a partial dispersion ratio of a material of the negative lens element in the second lens group, and νd2n denotes Abbe number of the material of the negative lens element in the second lens group at d-line (wavelength λ=587.6 nm).

According to a fourth aspect of the present invention, there is provided a method for forming an image of an object and varying a focal length of a zoom lens system that includes, in order from the object, a first lens group having negative refractive power, a second lens group having positive refractive power, and a third lens group having positive refractive power, including steps of varying a focal length of the zoom lens system from a wide-angle end state to a telephoto end state by moving the first lens group and the second lens group such that a distance between the first lens group and the second lens group decreases, and a distance between the second lens group and the third lens group increases, correcting variation in an imaging position caused by a camera shake with the second lens group having a vibration reduction function by moving the second lens group in a direction substantially perpendicular to the optical axis, and satisfying the following conditional expression (4):

$$1.8 < (1-\beta 2T) \cdot \beta 3T < 2.4 \quad (4)$$

where β2T denotes imaging magnification of the second lens group in the telephoto end state, and β3T denotes imaging magnification of the third lens group in the telephoto end state.

Other features and advantages according to the present invention will be readily under stood from the detailed description of the preferred embodiments in conjunction with the accompanying drawings.

BRIEF DESCRIPTION OF THE DRAWINGS

FIG. 1 is a sectional view showing a lens configuration of a zoom lens system according to Example 1 of the present invention together with zoom trajectories upon zooming.

FIG. 5 is a sectional view showing a lens configuration of a zoom lens system according to Example 2 of the present invention together with zoom trajectories upon zooming.

FIG. 9 is a sectional view showing a lens configuration of a zoom lens system according to Example 3 of the present invention together with zoom trajectories upon zooming.

DESCRIPTION OF THE MOST PREFERRED EMBODIMENTS

Figure 2A:
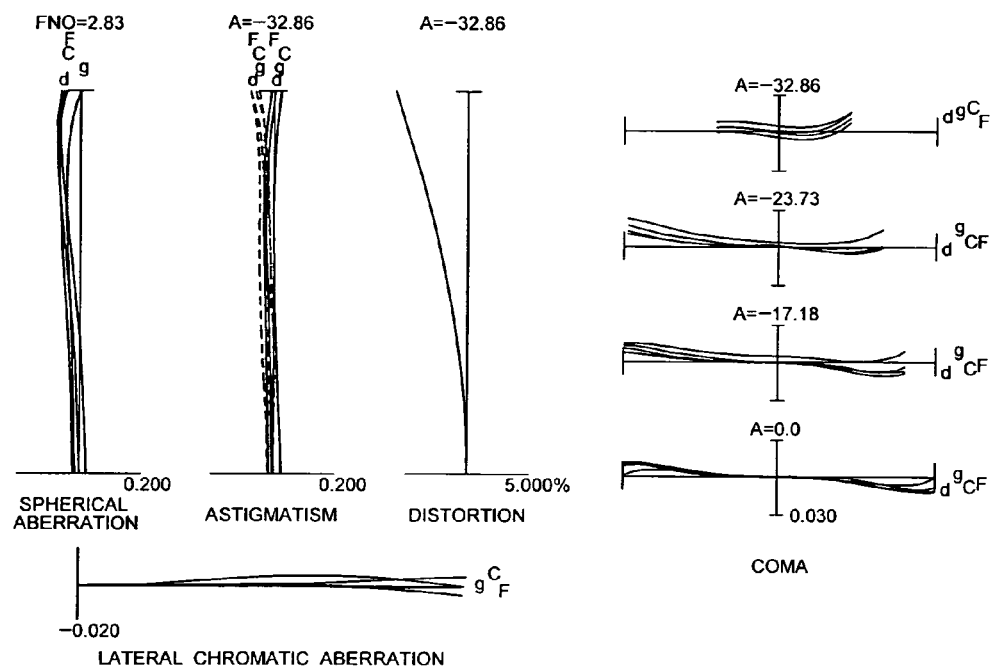
FIGS. 2A and 2B are graphs respectively showing various aberrations of the zoom lens system according to Example 1 in a wide-angle end state (f=7.73) upon focusing on infinity, and coma upon carrying out vibration reduction.

A zoom lens system according to the present invention is composed of, in order from an object along an optical axis, a first lens group having negative refractive power, a second lens group having positive refractive power, and a third lens group having positive refractive power. When a state of lens group positions varies from a wide-angle end state to a telephoto end state, the first lens group and the second lens group are moved such that a distance between the first lens group and the second lens group decreases, and a distance between the second lens group and the third lens group increases.

In the zoom lens system according to the present invention, the second lens group is composed of at least two positive lens elements and one negative lens element. At least one positive lens element and the negative lens element in the second lens group satisfy the following conditional expressions (1) and (2):

$$\theta gF2p > 0.64 - 0.0016 \cdot \nu d2p \quad (1)$$

$$\theta gF2n < 0.64 - 0.0016 \cdot \nu d2n \quad (2)$$

where $\theta gF2p$ denotes a partial dispersion ratio of the material of the at least one positive lens element in the second lens group, $\nu d2p$ denotes Abbe number of the material of the at least one positive lens element in the second lens group at d-line (wavelength $\lambda$=587.6 nm), $\theta gF2n$ denotes a partial dispersion ratio of the material of the negative lens element in the second lens group, and $\nu d2n$ denotes Abbe number of the material of the negative lens element in the second lens group at d-line (wavelength $\lambda$=587.6 nm).

The zoom lens system according to the present invention is a negative-leading type zoom lens system in which a lens group having negative refractive power is disposed as the most object side lens group. With this lens configuration, since the height of the ray with respect to the maximum angle of view from the optical axis in the wide-angle end state can be made small, the diameter of the front lens, which is disposed to the most object side, can be made small. When an electronic imaging device such as a CCD is used, although a low-pass filter for cutting off the light having higher spatial frequency than the resolution limit of the imaging device has to be disposed between the shooting lens and the imaging device, since the zoom lens system according to the present invention is a negative-leading type as described above, a sufficient back focal length can be secured. Moreover, since the zoom lens system according to the present invention has a third lens group having positive refractive power, the position of the exit pupil can be disposed away from the imaging device. Accordingly, a so-called shading, which is blocking off the light by the CCD and the like, can be prevented.

Conditional expression (1) defines an appropriate range of a relation between Abbe number at d-line (wavelength $\lambda$=587.6 nm) and the partial dispersion ratio of the material of the positive lens element in the second lens group, and shows anomalous dispersion of the material. Conditional expression (2) defines an appropriate range of a relation between Abbe number at d-line (wavelength $\lambda$=587.6 nm)

and the partial dispersion ratio of the material of the negative lens element in the second lens group, and shows anomalous dispersion of the material.

The above described partial dispersion ratio is expressed by (ng−nF)/(nF−nC), where ng denotes refractive index of the glass material at g-line (wavelength λ=435.8 nm), nF denotes refractive index of the glass material at F-line (wavelength λ=486.1 nm), and nC denotes refractive index of the glass material at C-line (wavelength λ=656.1 nm).

In a zoom lens system having negative-positive-positive power distribution, zooming from the wide-angle end state to the telephoto end state is carried out almost exclusively by changing the imaging magnification of the second lens group. Accordingly, due to chromatic aberration generating in the second lens group, longitudinal chromatic aberration is generated excessively in the telephoto end state. In this case, when the materials of the positive and negative lenses in the second lens group satisfy respective conditional expressions (1) and (2), chromatic aberration and secondary spectrum of chromatic aberration even in the telephoto end state can be small with fewer number of lens elements. Therefore, it becomes possible to obtain a zoom lens system having high resolution with a smaller blurred color.

In a zoom lens system according to the present invention, it is preferable that at least one lens surface in the second lens group is an aspherical surface.

With this construction, generation of spherical aberration can be suppressed, and even if the number of the negative lens elements in the second lens group is only one, spherical aberration can be sufficiently corrected.

In a zoom lens system according to the present invention, it is preferable that the first lens group is composed of two lens elements that are, in order from the object along the optical axis, a negative lens element and a positive lens element, the negative lens element in the first lens group has an aspherical surface, and the following conditional expression (3) is satisfied:

$$0.55<(vd1n-vd1p)/vd1p<1.2 \qquad (3)$$

where vd1n denotes Abbe number of the glass material of the negative lens element in the first lens group at d-line (wavelength λ=587.6 nm), and vd1p denotes Abbe number of the glass material of the positive lens element in the first lens group at d-line (wavelength λ=587.6 nm).

Conditional expression (3) defines an appropriate range of the relation of Abbe numbers of glass materials at d-line (wavelength λ=587.6 nm) between the negative lens element and the positive lens element in the first lens group. When the value (vd1n−vd1p)/vd1p is equal to or falls below the lower limit of conditional expression (3), it becomes extremely difficult to correct chromatic aberration. On the other hand, when the value (vd1n−vd1p)/vd1p is equal to or exceeds the upper limit of conditional expression (3), chromatic aberration is over corrected. Otherwise, in order to correct chromatic aberration suitably, the distance between the negative lens element and the positive lens element has to be large, so that the zoom lens system becomes large.

Accordingly, with satisfying conditional expression (3), the zoom lens system according to the present invention makes it possible to suitably correct chromatic aberration with accomplishing compactness. By introducing an aspherical surface into the negative lens element in the first lens group, distortion and astigmatism particularly in the wide-angle end state can be preferably corrected.

In order to secure the effect of the present invention, it is preferable to set the upper limit of conditional expression (3) to 1.0. In order to secure the effect of the present invention, it is preferable to set the lower limit of conditional expression (3) to 0.6.

Moreover, a zoom lens system according to the present invention is composed of, in order from an object along an optical axis, a first lens group having negative refractive power, a second lens group having positive refractive power, and a third lens group having positive refractive power. When a state of lens group positions varies from a wide-angle end state to a telephoto end state, the first lens group and the second lens group are moved such that a distance between the first lens group and the second lens group decreases, and a distance between the second lens group and the third lens group increases.

A zoom lens system according to the present invention has a vibration reduction function for correcting variation in an imaging position caused by a camera shake by moving the second lens group in a direction substantially perpendicular to the optical axis. The following conditional expression (4) is satisfied:

$$1.8<(1-\beta 2T)\cdot \beta 3T<2.4 \qquad (4)$$

where β2T denotes imaging magnification of the second lens group in the telephoto end state, and β3T denotes imaging magnification of the third lens group in the telephoto end state.

In a vibration reduction method that a portion or the whole of a lens group is decentered for correcting variation in an imaging position caused by a camera shake, it is required that correction can be carried out by a small amount of decentering, and deterioration of optical performance upon decentering is extremely small. In the negative-positive-positive type zoom lens system, a sufficient correction effect cannot be obtained by decentering the first lens group or the third lens group. On the other hand, when the second lens group is decentered, even if the amount of decentering is small, a sufficient correction effect can be obtained, and deterioration of optical performance upon decentering is small.

Conditional expression (4) defines an appropriate range of a relation between imaging magnification of the second lens group and that of the third lens group, and shows decentering sensitivity of the second lens group. When the value (1−β2T)·β3T is equal to or falls below the lower limit of conditional expression (4), a decentering amount of the second lens group for correcting a camera shake becomes large. Accordingly, coma is generated excessively, or a large camera shake cannot be corrected. On the other hand, when the value (1−β2T)−β3T is equal to or exceeds the upper limit of conditional expression (4), decentering sensitivity becomes excessively high, so that a minute image blur is produced as a result of a control error.

Accordingly, when a zoom lens system according to the present invention satisfies conditional expression (4), a vibration reduction mechanism that is compact yet has a sufficient correction effect for a camera shake can be accomplished.

In order to secure the effect of the present invention, it is preferable to set the lower limit of conditional expression (4) to 1.9. In order to maximize the effect of the present invention, it is preferable to set the lower limit of conditional expression (4) to 2.0.

In a zoom lens system according to an aspect of the present invention, it is preferable that the second lens group is composed of at least two positive lens elements and a negative lens element. At least one positive lens element and the negative lens element in the second lens group preferably satisfy the following conditional expressions (1) and (2):

$$\theta gF2p > 0.64 - 0.0016 \cdot vd2p \quad (1)$$

$$\theta gF2n < 0.64 - 0.0016 \cdot vd2n \quad (2)$$

where θgF2p denotes a partial dispersion ratio of the material of the at least one positive lens element in the second lens group, νd2p denotes Abbe number of the material of the at least one positive lens element in the second lens group at d-line (wavelength λ=587.6 nm), θgF2n denotes a partial dispersion ratio of the material of the negative lens element in the second lens group, and νd2n denotes Abbe number of the material of the negative lens element in the second lens group at d-line (wavelength λ=587.6 nm). Incidentally, the explanation regarding conditional expressions (1) and (2) have already been shown above, so duplicated explanation is omitted.

In a zoom lens system according to an aspect of the present invention, it is preferable that at least one surface of the second lens group is an aspherical surface.

With this construction, generation of spherical aberration can be suppressed, and even if the number of the negative lens elements in the second lens group is only one, spherical aberration can be sufficiently corrected.

In a zoom lens system according to an aspect of the present invention, it is preferable that the first lens group is composed of two lens elements that are, in order from the object along the optical axis, a negative lens element and a positive lens element, the negative lens element in the first lens group includes an aspherical surface, and the following conditional expression (3) is satisfied:

$$0.55 < (vd1n - vd1p)/vd1p < 1.2 \quad (3)$$

where νd1n denotes Abbe number of the glass material of the negative lens element in the first lens group at d-line (wavelength λ=587.6 nm), and νd1p denotes Abbe number of the glass material of the positive lens element in the first lens group at d-line (wavelength λ=587.6 nm). Incidentally, the explanation regarding conditional expression (3) has already been shown above, so duplicated explanation is omitted.

A zoom lens system according to each Example of the present invention is explained below with reference to accompanying drawings.

EXAMPLE 1

FIG. 1 is a sectional view showing a lens configuration of a zoom lens system according to Example 1 of the present invention together with zoom trajectories upon zooming.

The zoom lens system according to Example 1 is composed of, in order from an object along an optical axis, a first lens group G1 having negative refractive power, a second lens group G2 having positive refractive power, and a third lens group G3 having positive refractive power.

In the zoom lens system according to Example 1, when a state of lens group positions varies from a wide-angle end state to a telephoto end state, the first lens group G1 is moved at first to an image and then to the object, which is a so-called zoom trajectory having convex shape facing the image, and the second lens group G2 is moved to the object such that a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing the image, and a positive meniscus lens L12 having a convex surface facing the object. The image side surface of the negative meniscus lens L11 is an aspherical surface.

The second lens group G2 is composed of, in order from the object, a double convex positive lens L21, a cemented lens constructed by a double convex positive lens L22 cemented with a double concave negative lens L23, and a double convex positive lens L24. Both surfaces of the double convex positive lens L21 are aspherical surfaces.

The third lens group G3 is composed of a double convex positive lens L31.

In the zoom lens system according to Example 1, in order to correct variation in an imaging position caused by a camera shake, the second lens group G2 can be moved in the direction substantially perpendicular to the optical axis.

An aperture stop S is disposed in the vicinity of the object side of the second lens group G2, and moved together with the second lens group G2 in a body upon zooming from the wide-angle end state to the telephoto end state. However, the position of the aperture stop S is fixed upon vibration reduction, in other words, upon moving the second lens group G2 in the direction substantially perpendicular to the optical axis.

A low-pass filter FL for cutting off the light having higher spatial frequency than the resolution limit of the imaging device is disposed between the third lens group G3 and the image plane I.

Various values associated with Example 1 are listed in Table 1.

In [Specifications], f denotes a focal length of the zoom lens system, FNO denotes an f-number, and ω denotes a half angle of view (maximum incident angle, unit: degree).

In [Lens Data], the left most column shows the lens surface number counted in order from the object side, the second column "r" shows a radius of curvature of a lens surface, the third column "d" shows a distance to the next lens surfaces along the optical axis, the fourth column "n" shows refractive index of a medium at d-line (λ=587.6 nm), and the fifth column "νd" shows Abbe number of a medium at d-line (λ=587.6 nm). Incidentally, "r=∞" means a plane surface. Refractive index of the air n=1.0000 is omitted.

In the zoom lens system according to Example 1, an aspherical surface is expressed by the following expression:

$$x = cy^2 / \{1 + (1 - kc^2 xy^2)^{1/2}\} + C4 \times y^4 + C6 \times y^6 + \ldots$$

where y denotes a vertical height from the optical axis, x denotes a sag amount which is a distance along the optical axis from tangent plane at the vertex of the aspherical surface to the aspherical surface at the height y, c denotes a reference curvature (a paraxial curvature), K denotes a conical coefficient, and Cn denote an n-th order aspherical coefficient. In [Aspherical Data], "E-n" denotes "$10^{-n}$".

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other Examples.

TABLE 1

[Specifications]

| | W | M | T |
|---|---|---|---|
| f = | 7.73 | 14.00 | 25.50 |
| FNO = | 2.83 | 3.79 | 5.56 |
| ω = | 32.9 | 18.7 | 10.5 |

[Lens Data]

| | r | d | n | vd |
|---|---|---|---|---|
| 1 | 199.9089 | 1.5000 | 1.804700 | 40.95 |
| 2 | 6.4325 | 2.2000 | | |
| 3 | 11.3632 | 2.2000 | 1.846660 | 23.78 |
| 4 | 34.1057 | (D4) | | |
| 5 | ∞ | 0.4000 | Aperture Stop S | |
| 6 | 9.3771 | 2.2000 | 1.589129 | 61.25 |
| 7 | −66.5953 | 0.1000 | | |
| 8 | 8.0586 | 2.6000 | 1.696800 | 55.52 |
| 9 | −12.6511 | 0.8000 | 1.720467 | 34.71 |
| 10 | 4.9389 | 0.9500 | | |
| 11 | 129.8429 | 1.3000 | 1.487490 | 70.23 |
| 12 | −26.0946 | (D12) | | |
| 13 | 31.6570 | 1.9500 | 1.516330 | 64.14 |
| 14 | −31.6570 | (D14) | | |
| 15 | ∞ | 2.0000 | 1.544370 | 70.51 |
| 16 | ∞ | | | |

[Aspherical Data]

Surface Number 2

κ = 0.6633
C4 = −1.44620E−04
C6 = −1.64860E−06
C8 = −2.79270E−08
C10 = −6.79780E−10

Surface Number 6

κ = 0.4959
C4 = −1.02490E−05
C6 = −4.07290E−07
C8 = −2.48080E−08
C10 = −1.46980E−09

Surface Number 7

κ = 37.1078
C4 = 6.13700E−05
C6 = 0.00000E+00
C8 = 0.00000E+00
C10 = 0.00000E+00

[Variable Distances]

| | W | M | T |
|---|---|---|---|
| f | 7.7300 | 14.0000 | 25.5000 |
| D4 | 19.1488 | 8.1969 | 2.1165 |
| D12 | 6.0246 | 12.6944 | 24.9179 |
| D14 | 2.9565 | 2.9565 | 2.9565 |

[Values for Conditional Expressions]

Figure 2B:
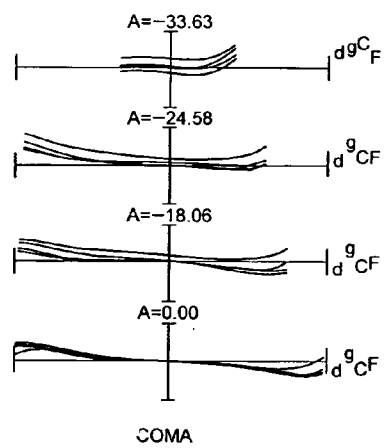

L23: vd2n = 34.71, θgF2n = 0.58344
L24: vd2n = 70.23, θgF2p = 0.53028
(1) 0.64 − 0.0016 × vd2p = 0.5276 (L24)
(2) 0.64 − 0.0016 × vd2n = 0.5845 (L23)
(3) (vd1n − vd1p)/vd1p = 0.72
(4) $(1 - \beta 2T) \times \beta 3T = 2.28$ FIGS. 2A and 2B are graphs respectively showing various aberrations of the zoom lens system according to Example 1 in a wide-angle end state (f=7.73) upon focusing on infinity, and coma upon carrying out vibration reduction.

Figure 3A:
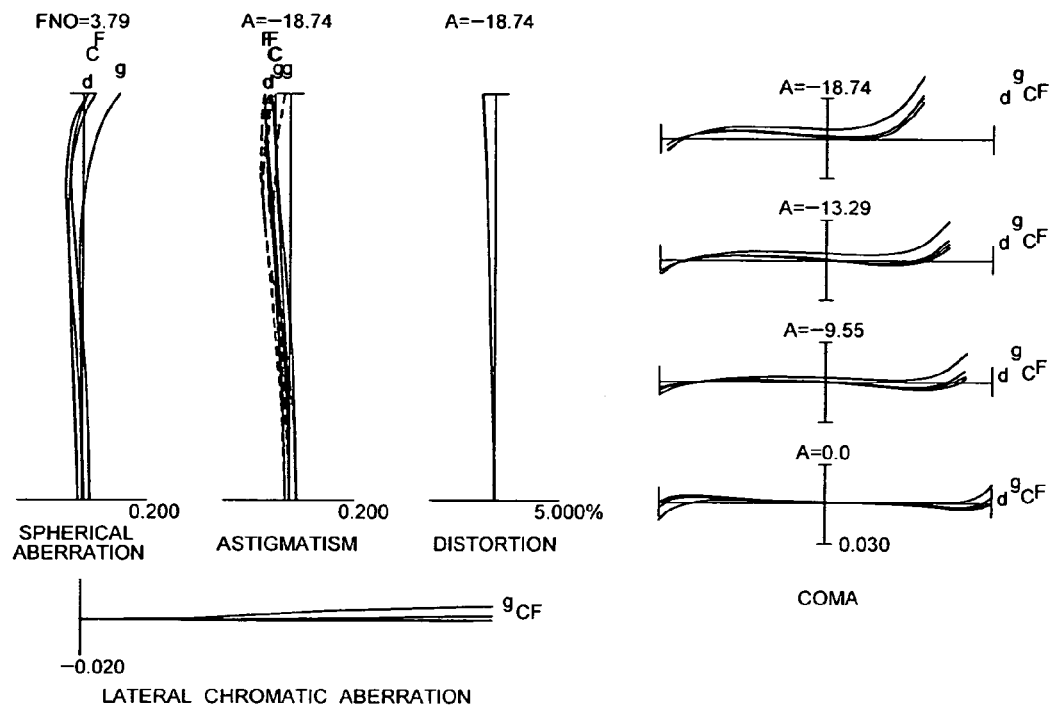
FIGS. 3A and 3B are graphs respectively showing various aberrations of the zoom lens system according to Example 1 in an intermediate focal length state (f=14.0) upon focusing on infinity, and coma upon carrying out vibration reduction.
Figure 3B:
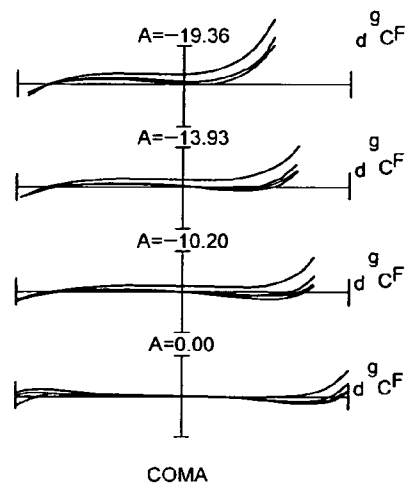

FIGS. 3A and 3B are graphs respectively showing various aberrations of the zoom lens system according to Example 1 in an intermediate focal length state (f=14.0) upon focusing on infinity, and coma upon carrying out vibration reduction.

Figure 4A:
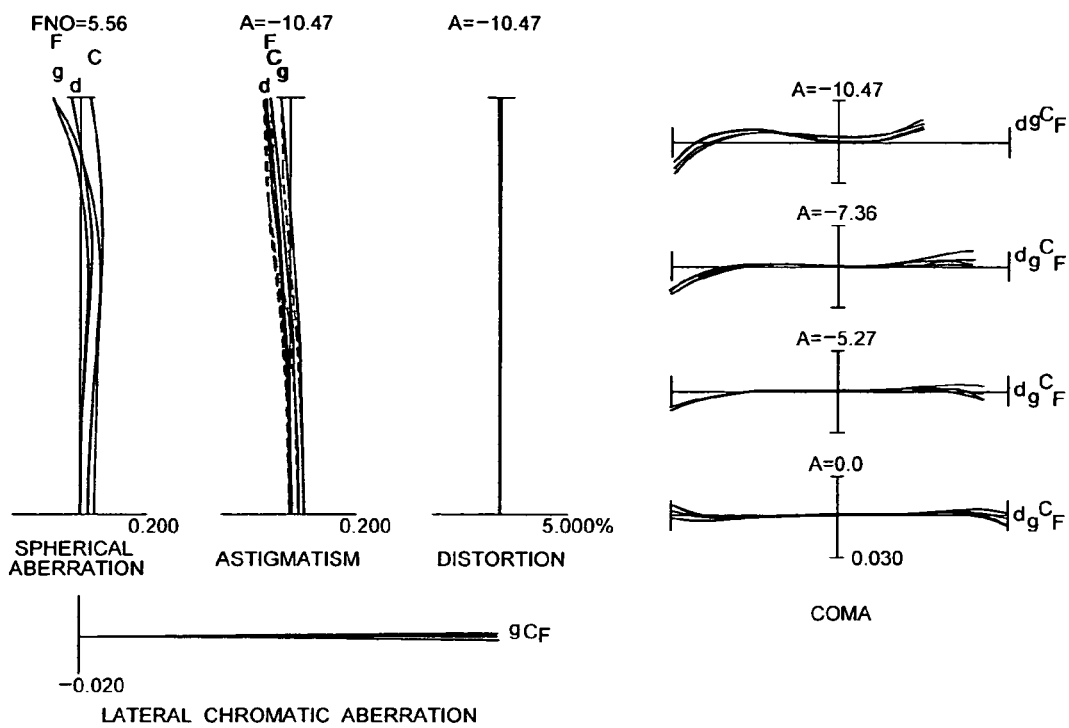
FIGS. 4A and 4B are graphs respectively showing various aberrations of the zoom lens system according to Example 1 in a telephoto end state (f=25.5) upon focusing on infinity, and coma upon carrying out vibration reduction.
Figure 4B:
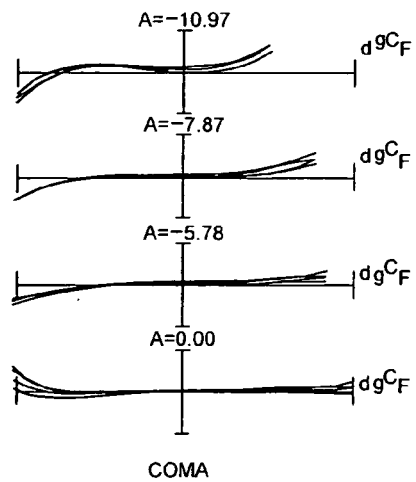

FIGS. 4A and 4B are graphs respectively showing various aberrations of the zoom lens system according to Example 1 in a telephoto end state (f=25.5) upon focusing on infinity, and coma upon carrying out vibration reduction.

In respective graphs, FNO denotes an f-number, A denotes a half angle of view (unit: degree). In the graphs showing spherical aberration, the f-number with respect to the maximum aperture is shown. In graphs showing astigmatism and distortion, the maximum value of the image height Y is shown. In respective graphs, "d" denotes aberration curve at d-line (λ=587.6 nm), "g" denotes aberration curve at g-line (λ=435.8 nm), "C" denotes aberration curve at C-line (λ=656.28 nm), and "F" denotes aberration curve at F-line (λ=486.1 nm). In the graph showing astigmatism, a solid line indicates a sagittal image plane, and a broken line indicates a meridional image plane. In graphs showing coma, coma with respect to a half angle of view is shown.

The above-described explanation regarding various aberration graphs is the same as the other Examples.

As is apparent from the respective graphs, the zoom lens system according to Example 1 shows superb optical performance as a result of good corrections to various aberrations in each focal length state from the wide-angle end state to the telephoto end state.

EXAMPLE 2

FIG. 5 is a sectional view showing a lens configuration of a zoom lens system according to Example 2 of the present invention together with zoom trajectories upon zooming.

The zoom lens system according to Example 2 is composed of, in order from an object along an optical axis, a first lens group G1 having negative refractive power, a second lens group G2 having positive refractive power, and a third lens group G3 having positive refractive power.

In the zoom lens system according to Example 2, when a state of lens group positions varies from a wide-angle end state to a telephoto end state, the first lens group G1 is moved at first to the image and then to the object, which is a so-called zoom trajectory having convex shape facing the image, and the second lens group G2 is moved to the object such that a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing the image, and a positive meniscus lens L12 having a convex surface facing the object. The image side surface of the negative meniscus lens L11 is an aspherical surface.

The second lens group G2 is composed of, in order from the object, a double convex positive lens L21, a cemented lens constructed by a double convex positive lens L22 cemented with a double concave negative lens L23, and a double convex positive lens L24. The object side surfaces of the double convex positive lens L22 is an aspherical surface.

The third lens group G3 is composed of a double convex positive lens L31.

In the zoom lens system according to Example 2, in order to correct variation in an imaging position caused by a camera shake, the second lens group G2 can be moved in the direction substantially perpendicular to the optical axis.

An aperture stop S is disposed in the vicinity of the object side of the second lens group G2, and moved together with the second lens group G2 in a body upon zooming from the wide-angle end state to the telephoto end state. However, the position of the aperture stop S is fixed upon vibration reduction, in other words, upon moving the second lens group G2 in the direction substantially perpendicular to the optical axis.

A low-pass filter FL for cutting off the light having higher spatial frequency than the resolution limit of the imaging device is disposed between the third lens group G3 and the image plane I.

Various values associated with Example 2 are listed in Table 2.

TABLE 2

[Specifications]

|   | W | M | T |
|---|---|---|---|
| f = | 7.72 | 14.00 | 25.50 |
| FNO = | 2.89 | 3.84 | 5.62 |
| ω = | 32.9 | 18.8 | 10.5 |

[Lens Data]

|   | r | d | n | vd |
|---|---|---|---|---|
| 1 | 200.0000 | 1.3000 | 1.772500 | 49.61 |
| 2 | 6.0701 | 2.0000 | | |
| 3 | 10.3134 | 2.2000 | 1.795040 | 28.56 |
| 4 | 32.0656 | (D4) | | |
| 5 | ∞ | 0.4000 | Aperture Stop S | |
| 6 | 7.1381 | 2.2000 | 1.497820 | 82.52 |
| 7 | −72.5371 | 0.1000 | | |
| 8 | 10.8934 | 2.6000 | 1.693500 | 53.22 |
| 9 | −6.8548 | 0.8000 | 1.654115 | 39.68 |
| 10 | 5.3379 | 0.9500 | | |
| 11 | 1831.2738 | 1.3000 | 1.497820 | 82.52 |
| 12 | −25.0522 | (D12) | | |
| 13 | 31.9868 | 1.9500 | 1.516330 | 64.14 |
| 14 | −31.9868 | (D14) | | |
| 15 | ∞ | 2.0000 | 1.544370 | 70.51 |
| 16 | ∞ | | | |

[Aspherical Data]

Surface Number 2

κ = 0.7848
C4 = −2.23260E−04
C6 = −4.82220E−06
C8 = 4.49560E−08
C10 = −4.43530E−09

Surface Number 8

κ = −0.7578
C4 = −1.81670E−04
C6 = −8.75290E−06
C8 = −3.20200E−08
C10 = −5.18520E−09

[Variable Distances]

|   | W | M | T |
|---|---|---|---|
| f | 7.7200 | 14.0000 | 25.5000 |
| D4 | 18.8461 | 7.9006 | 1.8325 |
| D12 | 6.1501 | 12.8069 | 24.9968 |
| D14 | 3.8000 | 3.8000 | 3.8000 |

[Values for Conditional Expressions]

L21: νd2p = 82.52, θgF2p = 0.53904
L23: νd2n = 39.68, θgF2n = 0.57371
L24: νd2p = 82.52, θgF2p = 0.53904
(1) 0.64 − 0.0016 × νd2p = 0.5080 (L21, L24)
(2) 0.64 − 0.0016 × νd2n = 0.5765 (L23)
(3) (νd1n − νd1p)/νd1p = 0.74
(4) (1− β2T) × β3T = 2.29

Figure 6A:
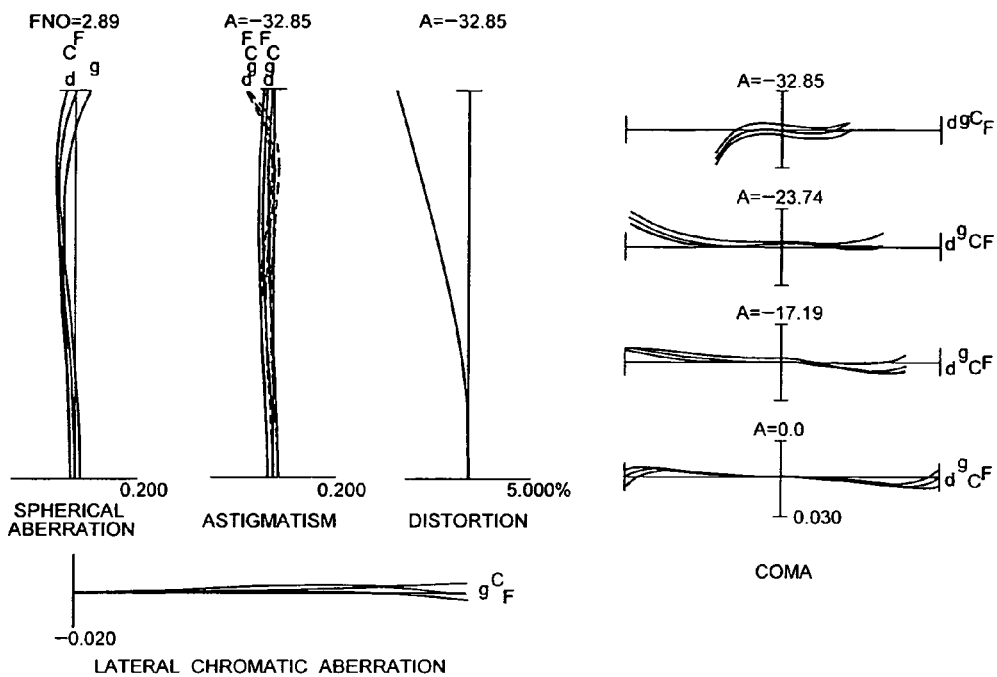
FIGS. 6A and 6B are graphs respectively showing various aberrations of the zoom lens system according to Example 2 in a wide-angle end state (f=7.72) upon focusing on infinity, and coma upon carrying out vibration reduction.
Figure 6B:
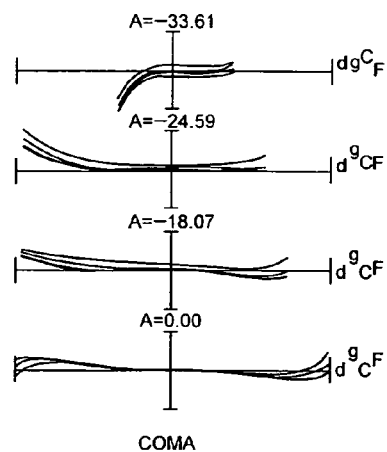

FIGS. 6A and 6B are graphs respectively showing various aberrations of the zoom lens system according to Example 2 in a wide-angle end state (f=7.72) upon focusing on infinity, and coma upon carrying out vibration reduction.

Figure 7A:
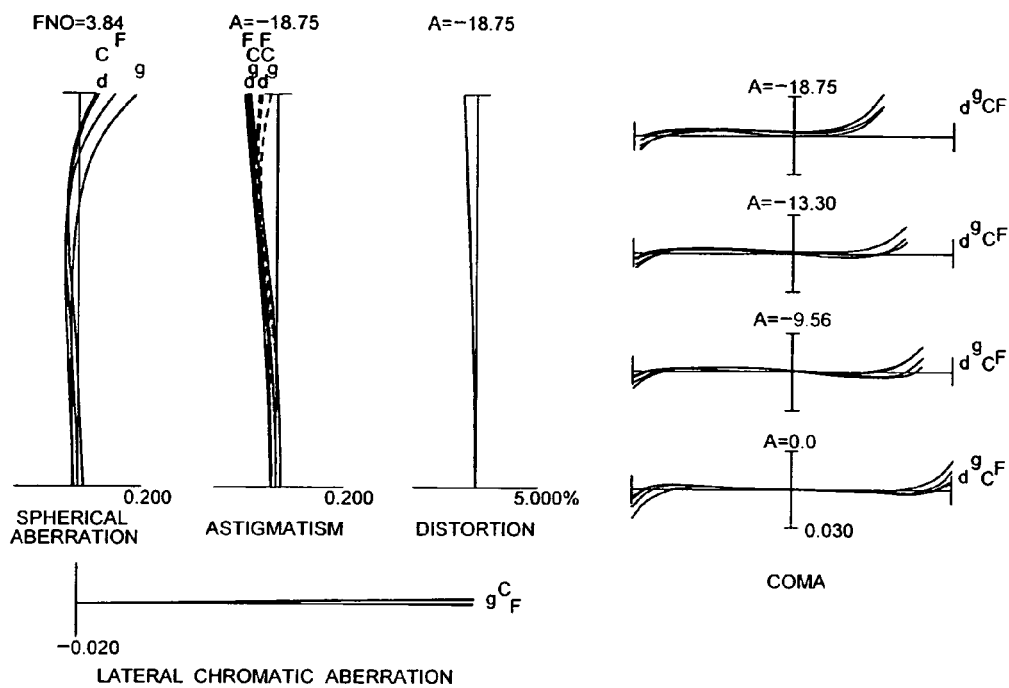
FIGS. 7A and 7B are graphs respectively showing various aberrations of the zoom lens system according to Example 2 in an intermediate focal length state (f=14.0) upon focusing on infinity, and coma upon carrying out vibration reduction.
Figure 7B:
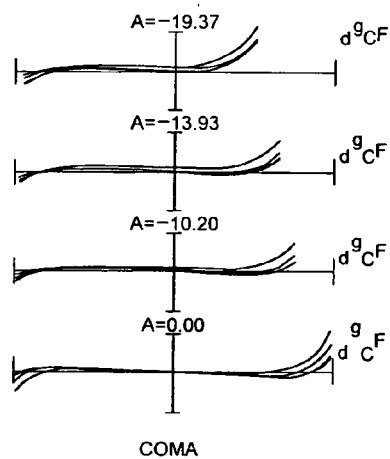

FIGS. 7A and 7B are graphs respectively showing various aberrations of the zoom lens system according to Example 2 in an intermediate focal length state (f=14.0) upon focusing on infinity, and coma upon carrying out vibration reduction.

Figure 8A:
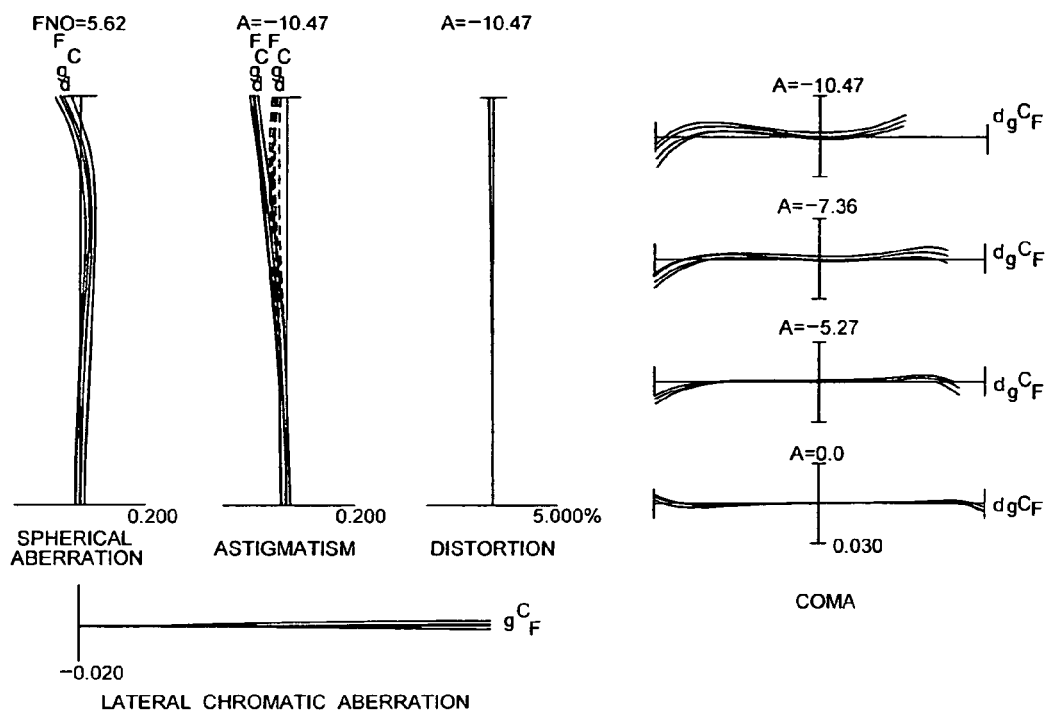
FIGS. 8A and 8B are graphs respectively showing various aberrations of the zoom lens system according to Example 2 in a telephoto end state (f=25.5) upon focusing on infinity, and coma upon carrying out vibration reduction.
Figure 8B:
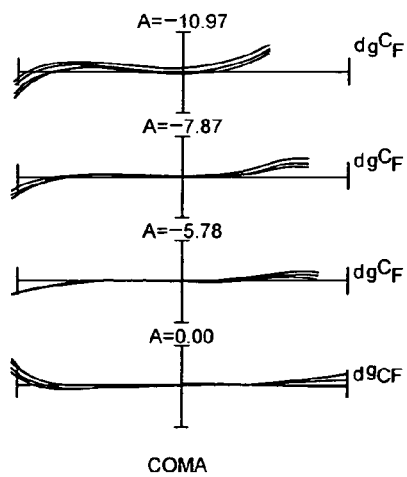

FIGS. 8A and 8B are graphs respectively showing various aberrations of the zoom lens system according to Example 2 in a telephoto end state (f=25.5) upon focusing on infinity, and coma upon carrying out vibration reduction.

As is apparent from the respective graphs, the zoom lens system according to Example 2 shows superb optical performance as a result of good corrections to various aberrations in each focal length state from the wide-angle end state to the telephoto end state.

EXAMPLE 3

FIG. 9 is a sectional view showing a lens configuration of a zoom lens system according to Example 3 of the present invention together with zoom trajectories upon zooming.

The zoom lens system according to Example 3 is composed of, in order from an object along an optical axis, a first lens group G1 having negative refractive power, a second lens group G2 having positive refractive power, and a third lens group G3 having positive refractive power.

In the zoom lens system according to Example 3, when a state of lens group positions varies from a wide-angle end state to a telephoto end state, the first lens group G1 is moved at first to the image and then to the object, which is a so-called zoom trajectory having convex shape facing the image, and the second lens group G2 is moved to the object such that a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing the image, and a positive meniscus lens L12 having a convex surface facing the object. The image side surface of the negative meniscus lens L11 is an aspherical surface.

The second lens group G2 is composed of, in order from the object, a double convex positive lens L21, a cemented lens constructed by a double convex positive lens L22 cemented with a double concave negative lens L23, and a flare stopper FS. The object side surface of the double convex positive lens L22 is an aspherical surface.

The third lens group G3 is composed of a double convex positive lens L31.

In the zoom lens system according to Example 3, in order to correct variation in an imaging position caused by a camera shake, the second lens group G2 can be moved in the direction substantially perpendicular to the optical axis.

An aperture stop S is disposed in the vicinity of the object side of the second lens group G2, and moved together with the second lens group G2 in a body upon zooming from the wide-angle end state to the telephoto end state. However, the position of the aperture stop S is fixed upon vibration reduction, in other words, upon moving the second lens group G2 in the direction substantially perpendicular to the optical axis.

A low-pass filter FL for cutting off the light having higher spatial frequency than the resolution limit of the imaging device is disposed between the third lens group G3 and the image plane I.

Various values associated with Example 3 are listed in Table 3.

TABLE 3

[Specifications]

|  | W | M | T |
|---|---|---|---|
| f = | 6.16 | 12.00 | 20.40 |
| FNO = | 2.85 | 4.02 | 5.72 |
| ω = | 32.9 | 17.6 | 10.6 |

[Lens Data]

| | r | d | n | vd |
|---|---|---|---|---|
| 1 | 160.0000 | 1.2000 | 1.772500 | 49.61 |
| 2 | 5.2260 | 1.7000 | | |
| 3 | 8.9100 | 1.8000 | 1.795040 | 28.56 |
| 4 | 28.1428 | (D4) | | |
| 5 | ∞ | 0.3200 | Aperture Stop S | |
| 6 | 5.1578 | 2.0000 | 1.497820 | 82.52 |
| 7 | −26.4540 | 0.0800 | | |
| 8 | 8.8360 | 2.0000 | 1.693500 | 53.22 |
| 9 | −5.2338 | 0.7000 | 1.654115 | 39.68 |
| 10 | 3.8596 | 1.0000 | | |
| 11 | ∞ | (D11) | Flare Stopper FS | |
| 12 | 12.1389 | 1.6000 | 1.487490 | 70.23 |
| 13 | −31.6570 | (D13) | | |
| 14 | ∞ | 2.0000 | 1.544370 | 70.51 |
| 15 | ∞ | | | |

[Aspherical Data]

Surface Number 2

$\kappa = 1.0034$
$C4 = -6.03760E-04$
$C6 = 4.29290E-08$
$C8 = -2.02910E-06$
$C10 = 9.39640E-08$
$C12 = -0.31075E-08$ Surface Number 8

$\kappa = -1.6196$
$C4 = -5.96210E-04$
$C6 = -4.32650E-05$
$C8 = -2.05240E-06$
$C10 = 1.00080E-07$
$C12 = -0.21220E-08$ Surface Number 12

$\kappa = -0.3572$
$C4 = 2.07340E-05$
$C6 = 1.65420E-05$
$C8 = -6.33070E-07$
$C10 = 9.69430E-09$

[Variable Distances]

|  | W | M | T |
|---|---|---|---|
| f | 6.1600 | 12.0000 | 20.4000 |
| D4 | 16.0275 | 6.5366 | 2.4144 |
| D11 | 10.7066 | 16.8724 | 25.7410 |
| D13 | 2.7992 | 2.7992 | 2.7992 |

[Values for Conditional Expressions]

L21: vd2p = 82.52, θgF2p = 0.53904
L23: vd2n = 39.68, θgF2n = 0.57371
(1) 0.64 − 0.0016 × vd2p = 0.5080 (L21)
(2) 0.64 − 0.0016 × vd2n = 0.5765 (L23)
(3) (vd1n − vd1p)/vd1p = 0.74
(4) (1 − β2T) × β3T = 2.11

Figure 10A:
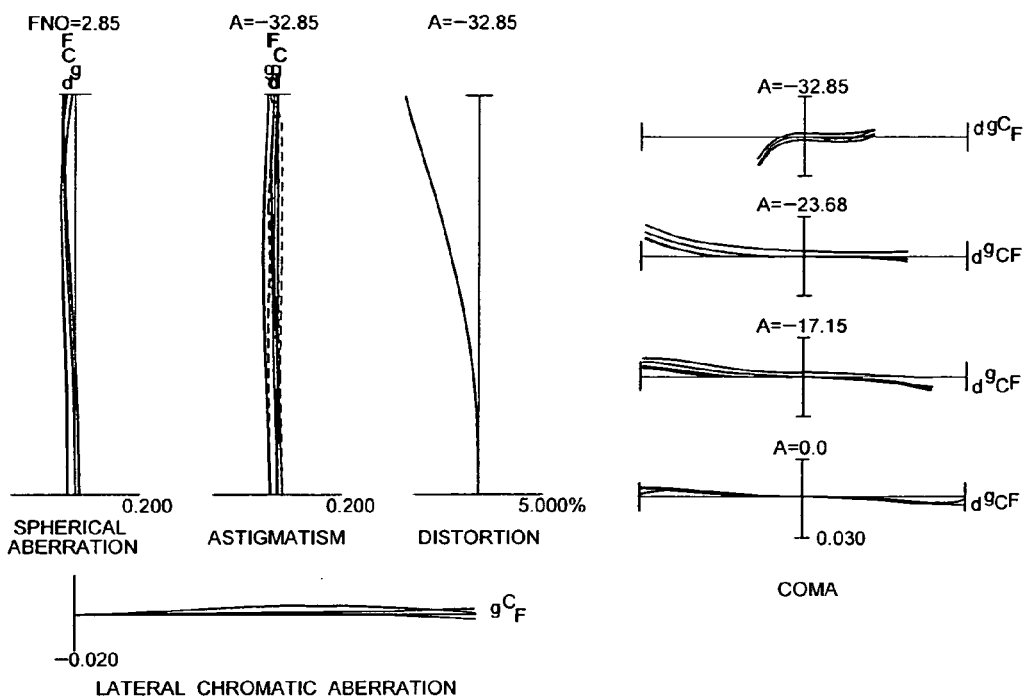
FIGS. 10A and 10B are graphs respectively showing various aberrations of the zoom lens system according to Example 3 in a wide-angle end state (f=6.16) upon focusing on infinity, and coma upon carrying out vibration reduction.
Figure 10B:
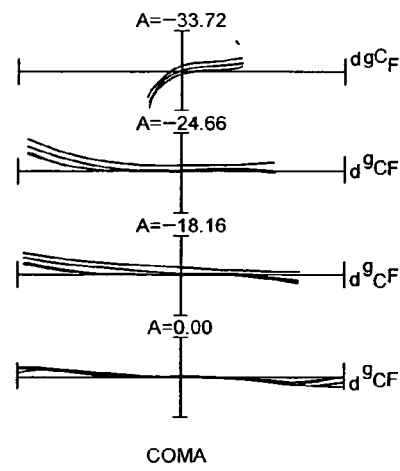

FIGS. 10A and 10B are graphs respectively showing various aberrations of the zoom lens system according to Example 3 in a wide-angle end state (f=6.16) upon focusing on infinity, and coma upon carrying out vibration reduction.

Figure 11A:
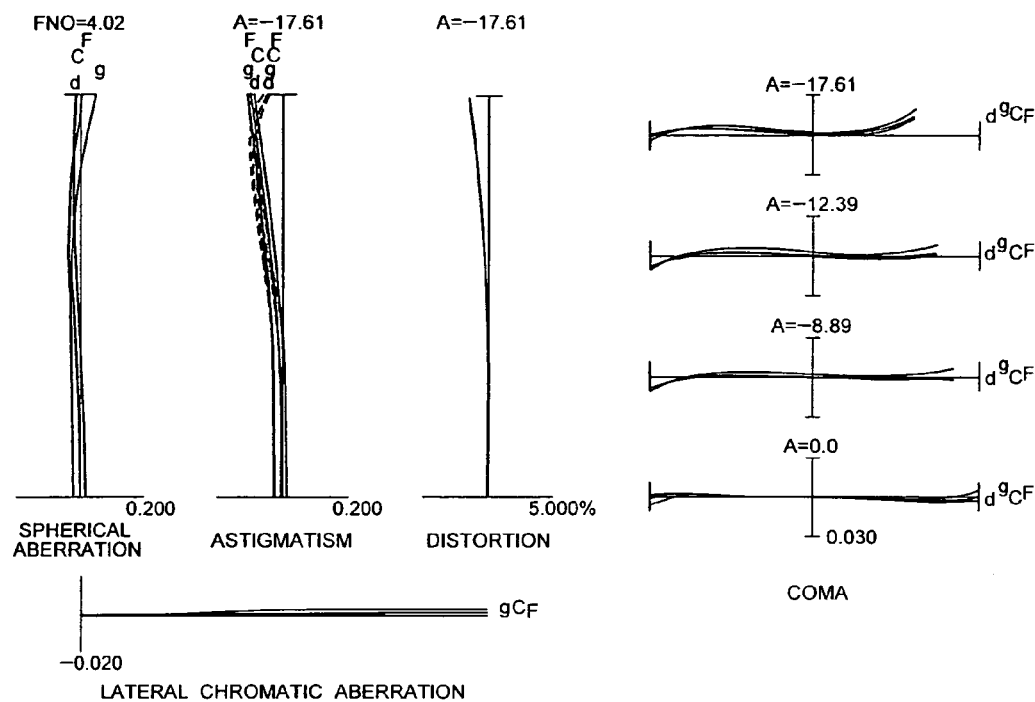
FIGS. 11A and 11B are graphs respectively showing various aberrations of the zoom lens system according to Example 3 in an intermediate focal length state (f=12.0) upon focusing on infinity, and coma upon carrying out vibration reduction.
Figure 11B:
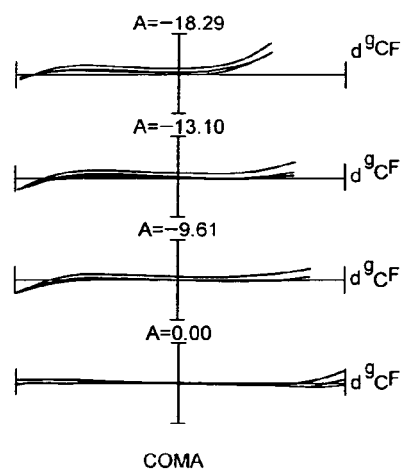

FIGS. 11A and 11B are graphs respectively showing various aberrations of the zoom lens system according to Example 3 in an intermediate focal length state (f=12.0) upon focusing on infinity, and coma upon carrying out vibration reduction.

Figure 12A:
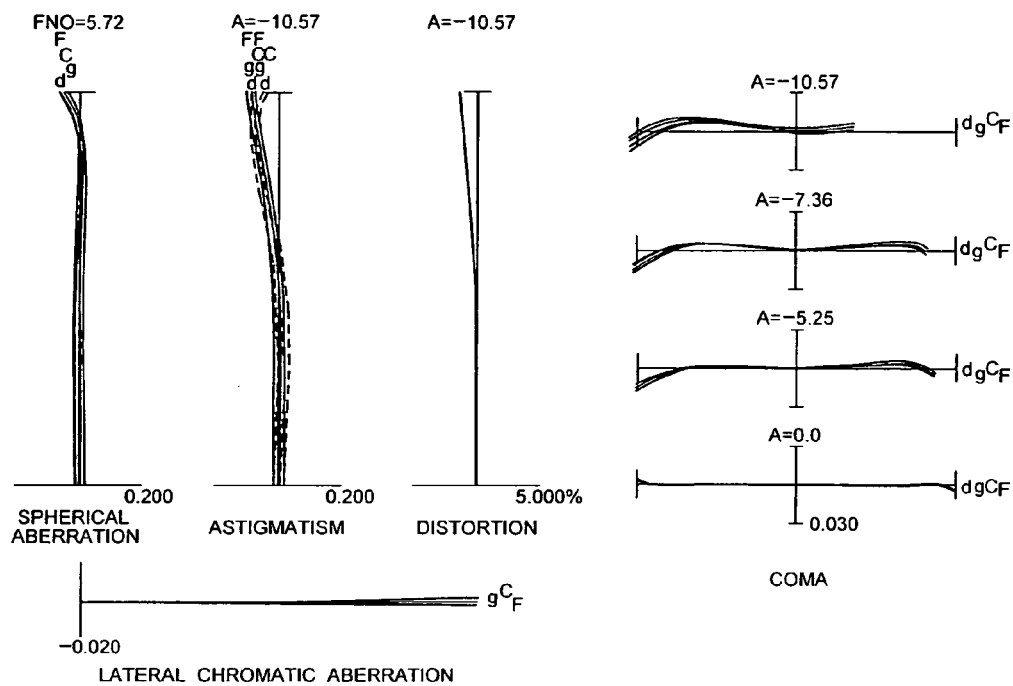
FIGS. 12A and 12B are graphs respectively showing various aberrations of the zoom lens system according to Example 3 in a telephoto end state (f=20.4) upon focusing on infinity, and coma upon carrying out vibration reduction.
Figure 12B:
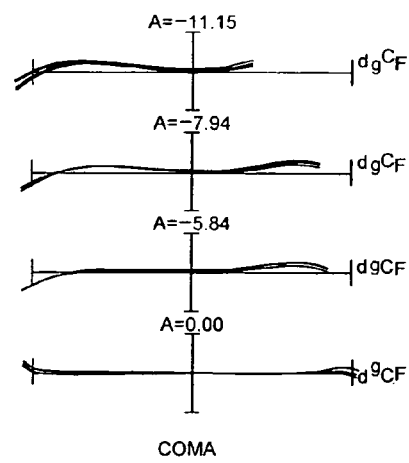

FIGS. 12A and 12B are graphs respectively showing various aberrations of the zoom lens system according to Example 3 in a telephoto end state (f=20.4) upon focusing on infinity, and coma upon carrying out vibration reduction.

As is apparent from the respective graphs, the zoom lens system according to Example 3 shows superb optical performance as a result of good corrections to various aberrations in each focal length state from the wide-angle end state to the telephoto end state.

EXAMPLE 4

Figure 13:
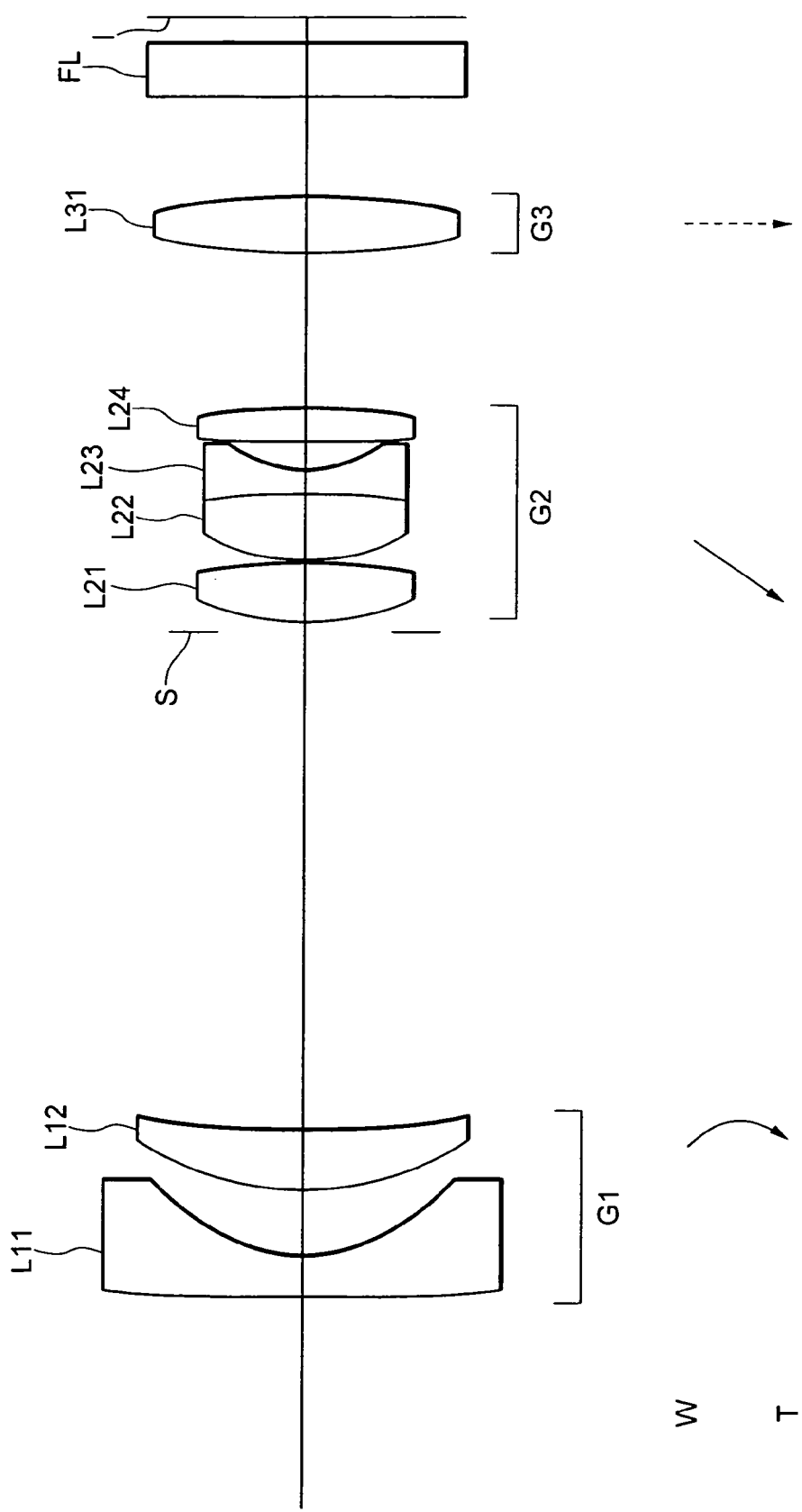
FIG. 13 is a sectional view showing a lens configuration of a zoom lens system according to Example 4 of the present invention together with zoom trajectories upon zooming.

FIG. 13 is a sectional view showing a lens configuration of a zoom lens system according to Example 4 of the present invention together with zoom trajectories upon zooming.

The zoom lens system according to Example 4 is composed of, in order from an object along an optical axis, a first lens group G1 having negative refractive power, a second lens group G2 having positive refractive power, and a third lens group G3 having positive refractive power.

In the zoom lens system according to Example 4, when a state of lens group positions varies from a wide-angle end state to a telephoto end state, the first lens group G1 is moved at first to an image and then to the object, which is a so-called zoom trajectory having convex shape facing the image, and the second lens group G2 is moved to the object such that a distance between the first lens group G1 and the second lens group G2 decreases, and a distance between the second lens group G2 and the third lens group G3 increases.

The first lens group G1 is composed of, in order from the object, a negative meniscus lens L11 having a concave surface facing the image, and a positive meniscus lens L12 having a convex surface facing the object. The image side surface of the negative meniscus lens L11 is an aspherical surface.

The second lens group G2 is composed of, in order from the object, a double convex positive lens L21, a cemented lens constructed by a double convex positive lens L22 cemented with a double concave negative lens L23, and a double convex positive lens L24. Both surfaces of the double convex positive lens L21 are aspherical surfaces.

The third lens group G3 is composed of a double convex positive lens L31.

In the zoom lens system according to Example 4, in order to correct variation in an imaging position caused by a camera shake, the second lens group G2 can be moved in the direction substantially perpendicular to the optical axis.

An aperture stop S is disposed in the vicinity of the object side of the second lens group G2, and moved together with the second lens group G2 in a body upon zooming from the wide-angle end state to the telephoto end state. However, the position of the aperture stop S is fixed upon vibration reduction, in other words, upon moving the second lens group G2 in the direction substantially perpendicular to the optical axis.

A low-pass filter FL for cutting off the light having higher spatial frequency than the resolution limit of the imaging device is disposed between the third lens group G3 and the image plane I.

Various values associated with Example 4 are listed in Table 4.

TABLE 4

[Specifications]

|  | W | M | T |
|---|---|---|---|
| f = | 7.73 | 14.00 | 21.80 |
| FNO = | 2.87 | 3.84 | 5.06 |

TABLE 4-continued

| ω = | 32.9 | 18.7 | 12.2 |
|---|---|---|---|

[Lens Data]

| | r | d | n | vd |
|---|---|---|---|---|
| 1 | 186.8129 | 1.5000 | 1.773770 | 47.18 |
| 2 | 6.5064 | 2.5000 | | |
| 3 | 11.6258 | 2.2000 | 1.805180 | 25.43 |
| 4 | 31.2859 | (D4) | | |
| 5 | ∞ | 0.4000 | Aperture Stop S | |
| 6 | 9.9886 | 2.2000 | 1.487490 | 70.23 |
| 7 | −31.8556 | 0.1000 | | |
| 8 | 7.1455 | 2.6000 | 1.696800 | 55.52 |
| 9 | −23.7572 | 0.9000 | 1.720467 | 34.71 |
| 10 | 4.7240 | 1.0000 | | |
| 11 | 51.7854 | 1.3000 | 1.497820 | 82.52 |
| 12 | −42.6455 | (D12) | | |
| 13 | 33.0418 | 1.9500 | 1.516330 | 64.14 |
| 14 | −33.0418 | (D14) | | |
| 15 | ∞ | 2.0000 | 1.544370 | 70.51 |
| 16 | ∞ | | | |

[Aspherical Data]

Surface Number 2

κ = 0.7024
C4 = −1.51030E−04
C6 = −1.75080E−06
C8 = −2.82640E−08
C10 = −1.40700E−09

Surface Number 6

κ = 1.0000
C4 = −1.18780E−04
C6 = −2.47640E−06
C8 = −8.62880E−08
C10 = −1.40700E−09

Surface Number 7

κ = 35.0000
C4 = 1.48430E−04
C6 = 0.00000E+00
C8 = 0.00000E+00
C10 = 0.00000E+00

[Variable Distances]

| | W | M | T |
|---|---|---|---|
| f | 7.7300 | 14.0000 | 21.8000 |
| D4 | 19.1499 | 8.1962 | 3.3644 |
| D12 | 6.0242 | 12.6936 | 20.9905 |
| D14 | 3.8000 | 3.8000 | 3.8000 |

[Values for Conditional Expressions]

L21: vd2p = 70.23, θgF2p = 0.53028
L23: vd2n = 34.71, θgF2n = 0.58344
L24: vd2p = 82.52, θgF2p = 0.53904
(1) 0.64 − 0.0016 × vd2p = 0.5276 (L21)
    0.64 − 0.0016 × vd2p = 0.5080 (L24)
(2) 0.64 − 0.0016 × vd2n = 0.5845 (L23)
(3) (vd1n − vd1p)/vd1p = 0.86
(4) (1 − β2T) × β3T = 2.09

Figure 14A:
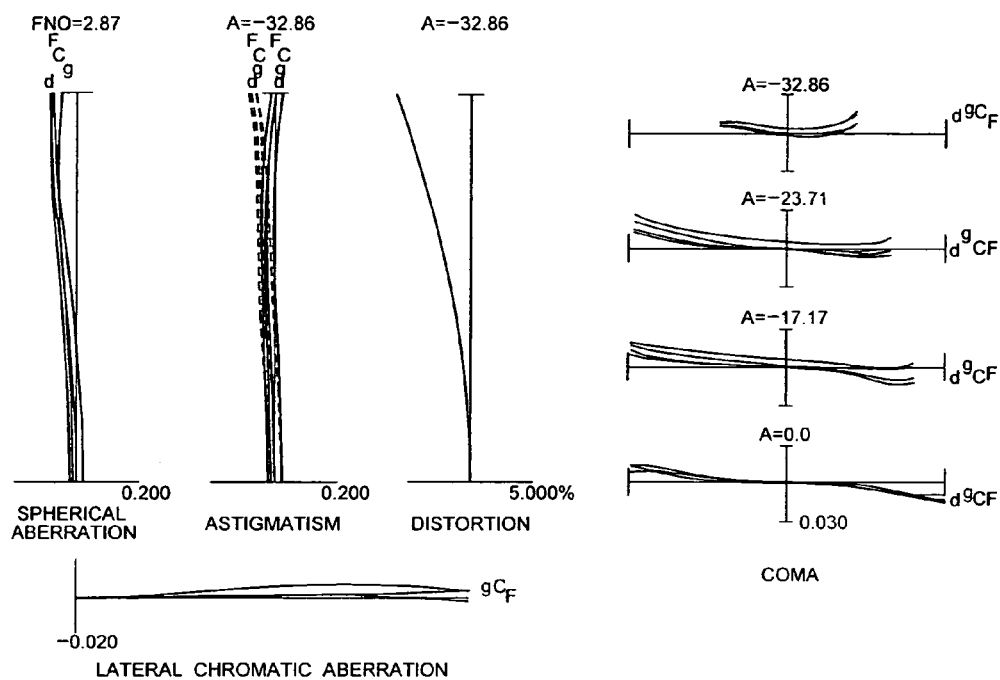
FIGS. 14A and 14B are graphs respectively showing various aberrations of the zoom lens system according to Example 4 in a wide-angle end state (f=7.73) upon focusing on infinity, and coma upon carrying out vibration reduction.
Figure 14B:
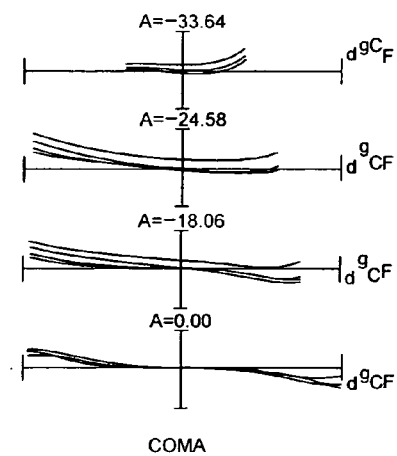

FIGS. 14A and 14B are graphs respectively showing various aberrations of the zoom lens system according to Example 4 in a wide-angle end state (f=7.73) upon focusing on infinity, and coma upon carrying out vibration reduction.

Figure 15A:
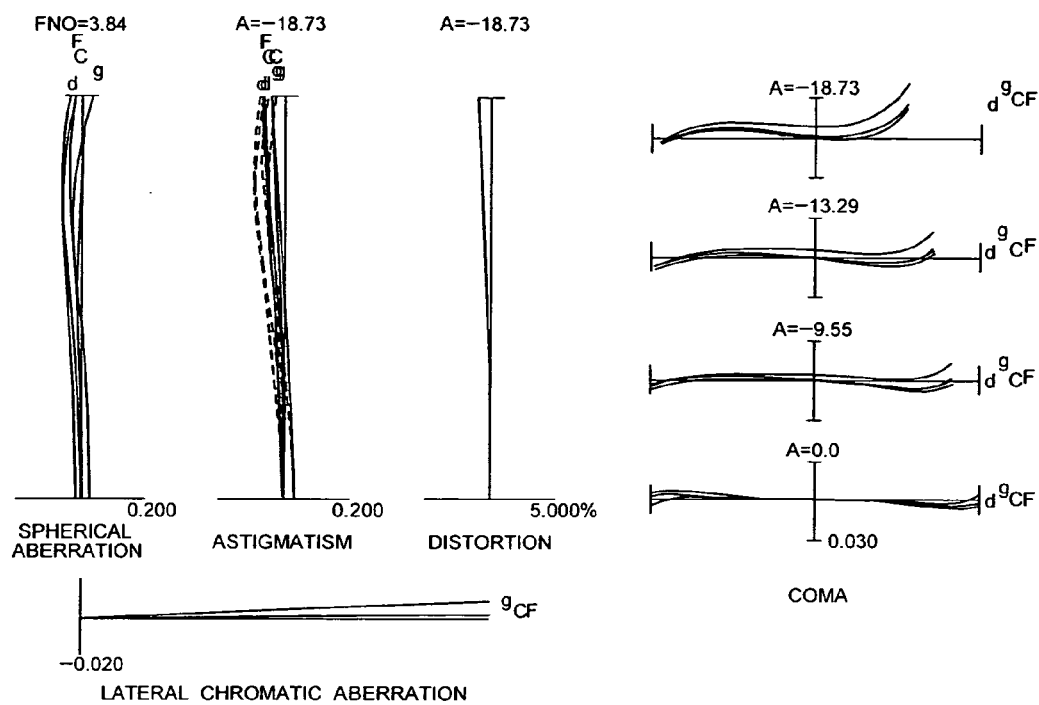
FIGS. 15A and 15B are graphs respectively showing various aberrations of the zoom lens system according to Example 4 in an intermediate focal length state (f=14.0) upon focusing on infinity, and coma upon carrying out vibration reduction.
Figure 15B:
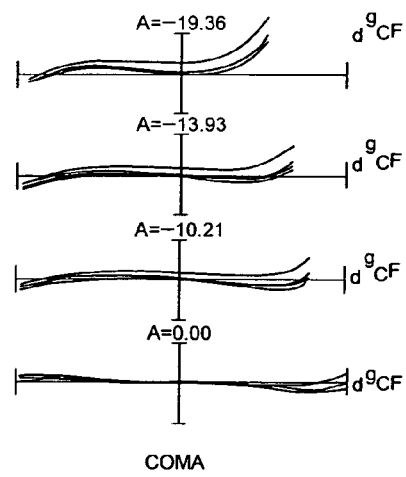

FIGS. 15A and 15B are graphs respectively showing various aberrations of the zoom lens system according to Example 4 in an intermediate focal length state (f=14.0) upon focusing on infinity, and coma upon carrying out vibration reduction.

Figure 16A:
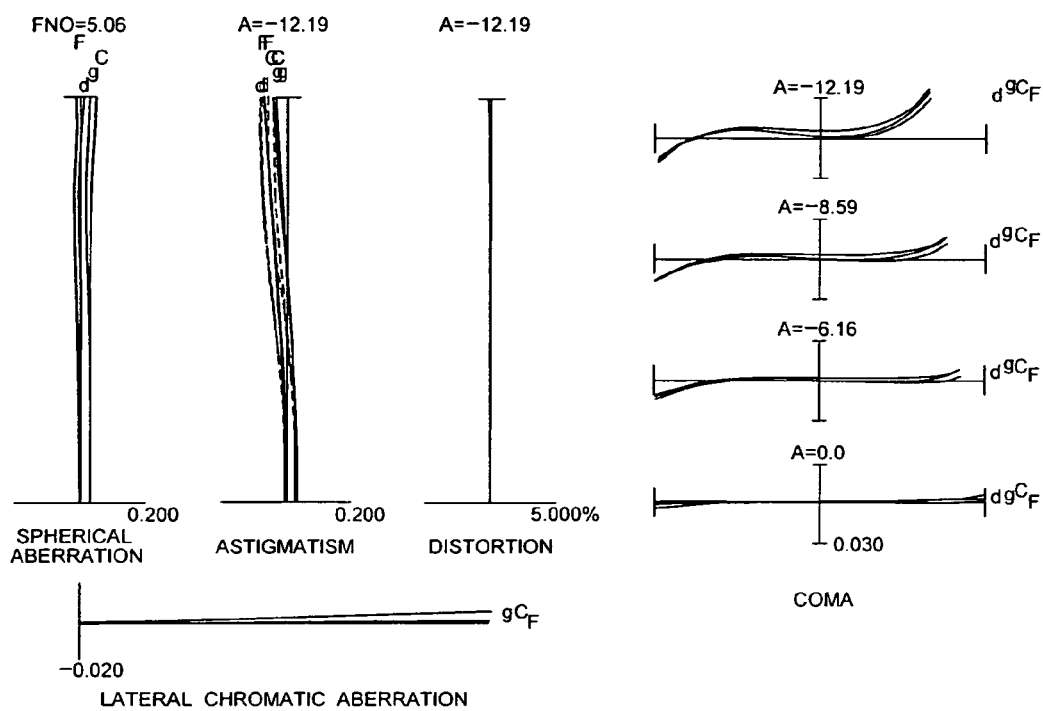
FIGS. 16A and 16B are graphs respectively showing various aberrations of the zoom lens system according to Example 4 in a telephoto end state (f=25.5) upon focusing on infinity, and coma upon carrying out vibration reduction.
Figure 16B:
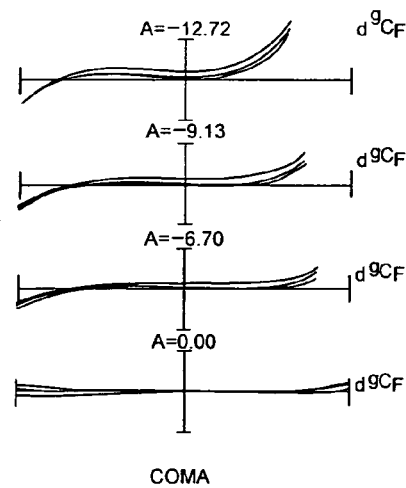

FIGS. 16A and 16B are graphs respectively showing various aberrations of the zoom lens system according to Example 4 in a telephoto end state (f=25.5) upon focusing on infinity, and coma upon carrying out vibration reduction.

As is apparent from the respective graphs, the zoom lens system according to Example 4 shows superb optical performance as a result of good corrections to various aberrations in each focal length state from the wide-angle end state to the telephoto end state.

As described above, the present invention makes it possible to provide a compact zoom lens system with high optical performance suitable for an electronic imaging device with a large number of pixels, and in particular to a zoom lens system with a vibration reduction function capable of accomplishing high optical performance even upon carrying out vibration reduction.

Incidentally, it is needless to say that although zoom lens systems with a three-lens-group configuration are shown as respective Examples of the present invention, a zoom lens system simply added by a lens group to the three-lens-group configuration is included in the spirit or scope of the present invention. Moreover, in the configuration of each lens group, a lens group simply added by lens elements to the lens group shown in Examples is included in the spirit or scope of the present invention.

Focusing from infinity to a close object may be carried out by moving a portion of a lens group, a lens group or a plurality of lens groups along the optical axis. The focusing lens group(s) may be used for auto focus, and suitable for being driven by a motor such as an ultrasonic motor. In particular, it is preferable that the third lens group or the first lens group is the focusing lens group.

Any one of lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In each lens surface, an antireflection coating having high transmittance over a broad wavelength range is applied to reduce flare or ghost images, so that high optical performance with a high contrast can be attained.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object along an optical axis:

a first lens group having negative refractive power;
a second lens group having positive refractive power; and
a third lens group having positive refractive power,
when a state of lens group positions varies from a wide-angle end state to a telephoto end state, the first lens group and the second lens group being moved such that a distance between the first lens group and the second lens group decreases, and a distance between the second lens group and the third lens group increases,
the second lens group being composed of at least two positive lens elements and one negative lens element, and
at least one positive lens element and the negative lens element in the second lens group satisfying the following conditional expressions:

$\theta gF2p > 0.64 - 0.0016 \cdot vd2p$ $\theta gF2n < 0.64 - 0.0016 \cdot vd2n$ where θgF2p denotes a partial dispersion ratio of a material of the at least one positive lens element in the second lens group, νd2p denotes Abbe number of the material of the at least one positive lens element in the second lens group at d-line (wavelength λ=587.6 nm), θgF2n denotes a partial dispersion ratio of a material of the negative lens element in the second lens group, and νd2n denotes Abbe number of the material of the negative lens element in the second lens group at d-line (wavelength λ=587.6 nm).

2. The zoom lens system according to claim 1, wherein at least one lens surface in the second lens group is an aspherical surface.

3. The zoom lens system according to claim 2, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(\nu d1n-\nu d1p)/\nu d1p<1.2$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

4. The zoom lens system according to claim 1, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(\nu d1n-\nu d1p)/\nu d1p<1.2$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

5. The zoom lens system according to claim 1, wherein an aperture stop is disposed in the vicinity of the second lens group or in the second lens group.

6. A zoom lens system comprising, in order from an object along an optical axis:
a first lens group having negative refractive power;
a second lens group having positive refractive power; and
a third lens group having positive refractive power,
when a state of lens group positions varies from a wide-angel end state to a telephoto end state, the first lens group and the second lens group being moved such that a distance between the first lens group and the second lens group decreases, and a distance between the second lens group and the third lens group increases,
the second lens group having a vibration reduction function that corrects variation in an imaging position caused by a camera shake by moving the second lens group in a direction substantially perpendicular to the optical axis, and
the following conditional expression being satisfied:

$$1.8<(1-\beta 2T)\cdot \beta 3<2.4$$

where β2T denotes imaging magnification of the second lens group in the telephoto end state, and β3T denotes imaging magnification of the third lens group in the telephoto end state.

7. The zoom lens system according to claim 6, wherein the second lens group is composed of at least two positive lens elements and one negative lens element, and wherein at least one positive lens element and the negative lens element in the second lens group satisfy the following conditional expressions:

$$\theta gF2p>0.64-0.0016\cdot \nu d2p$$

$$\theta gF2n<0.64-0.0016\cdot \nu d2n$$

where θgF2p denotes a partial dispersion ratio of a material of the at least one positive lens element in the second lens group, νd2p denotes Abbe number of the material of the at least one positive lens element in the second lens group at d-line (wavelength λ=587.6 nm), θgF2n denotes a partial dispersion ratio of a material of the negative lens element in the second lens group, and νd2n denotes Abbe number of the material of the negative lens element in the second lens group at d-line (wavelength λ=587.6 nm).

8. The zoom lens system according to claim 7, wherein at least one lens surface in the second lens group is an aspherical surface.

9. The zoom lens system according to claim 8, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(\nu d1n-\nu d1p)/\nu d1p<1.2$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

10. The zoom lens system according to claim 7, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(\nu d1n-\nu d1p)/\nu d1p<1.2$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

11. The zoom lens system according to claim 6, wherein at least one lens surface in the second lens group is an aspherical surface.

12. The zoom lens system according to claim 11, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(\nu d1n-\nu d1p)/\nu d1p<1.2$$

where νd1n denotes Abbe number of a glass material of the negative lens element in the first lens group at d-line (wavelength λ=587.6 nm), and νd1p denotes Abbe number of a glass material of the positive lens element in the first lens group at d-line (wavelength λ=587.6 nm).

13. The zoom lens system according to claim 6, wherein the first lens group is composed of two lens elements that are, in order from the object along the optical axis, a negative lens element and a positive lens element, the negative lens element in the first lens group has an aspherical surface, and the following conditional expression is satisfied:

$$0.55<(vd1n-vd1p)/vd1p<1.2$$

where vd1n denotes Abbe number of a glass material of the negative lens element in the first lens group at d-line (wavelength λ=587.6 nm), and vd1p denotes Abbe number of a glass material of the positive lens element in the first lens group at d-line (wavelength λ=587.6 nm).

14. The zoom lens system according to claim 6, wherein an aperture stop is disposed in the vicinity of the second lens group or in the second lens group.

15. A method for forming an image of an object and varying a focal length of a zoom lens system that includes, in order from the object, a first lens group having negative refractive power, a second lens group having positive refractive power, and a third lens group having positive refractive power, comprising steps of:
varying a focal length of the zoom lens system from a wide-angle end state to a telephoto end state by moving the first lens group and the second lens group such that a distance between the first lens group and the second lens group decreases, and a distance between the second lens group and the third lens group increases,
constructing the second lens group by at least two positive lens elements and one negative lens element, and
satisfying the following conditional expressions with at least one positive lens element and the negative lens element in the second lens group:

$$\theta gF2p>0.64-0.0016 \cdot vd2p$$

$$\theta gF2n<0.64-0.0016 \cdot vd2n$$

where θgF2p denotes a partial dispersion ratio of a material of the at least one positive lens element in the second lens group, vd2p denotes Abbe number of the material of the at least one positive lens element in the second lens group at d-line (wavelength λ=587.6 nm), θgF2n denotes a partial dispersion ratio of a material of the negative lens element in the second lens group, and vd2n denotes Abbe number of the material of the negative lens element in the second lens group at d-line (wavelength λ=587.6 nm).

16. The method for forming an image of an object and varying a focal length of a zoom lens system according to claim 15, further comprising the step of:
including at least one aspherical surface in the second lens group.

17. The method for forming an image of an object and varying a focal length of a zoom lens system according to claim 15, further comprising steps of:
constructing the first lens group by two lens elements which are, in order from the object along the optical axis, a negative lens element and a positive lens element,
including an aspherical surface in the negative lens element of the first lens group, and
satisfying the following conditional expression:

$$0.55<(vd1n-vd1p)/vd1p<1.2$$

where vd1n denotes Abbe number of a glass material of the negative lens element in the first lens group at d-line (wavelength λ=587.6 nm), and vd1p denotes Abbe number of a glass material of the positive lens element in the first lens group at d-line (wavelength λ=587.6 nm).

18. A method for forming an image of an object and varying a focal length of a zoom lens system that includes, in order from the object, a first lens group having negative refractive power, a second lens group having positive refractive power, and a third lens group having positive refractive power, comprising steps of:
varying a focal length of the zoom lens system from a wide-angle end state to a telephoto end state by moving the first lens group and the second lens group such that a distance between the first lens group and the second lens group decreases, and a distance between the second lens group and the third lens group increases,
correcting variation in an imaging position caused by a camera shake with the second lens group having a vibration reduction function by moving the second lens group in a direction substantially perpendicular to the optical axis, and
satisfying the following conditional expression:

$$1.8<(1-\beta 2T)\cdot \beta 3T<2.4$$

where β2T denotes imaging magnification of the second lens group in the telephoto end state, and β3T denotes imaging magnification of the third lens group in the telephoto end state.

19. The method for forming an image of an object and varying a focal length of a zoom lens system according to claim 18, further comprising steps of:
constructing the second lens group by at least two positive lens elements and one negative lens element, and
satisfying the following conditional expressions with at least one positive lens element and the negative lens element in the second lens group:

$$\theta gF2p>0.64-0.0016 \cdot vd2p$$

$$\theta gF2n<0.64-0.0016 \cdot vd2n$$

where θgF2p denotes a partial dispersion ratio of a material of the at least one positive lens element in the second lens group, vd2p denotes Abbe number of the material of the at least one positive lens element in the second lens group at d-line (wavelength λ=587.6 nm), θgF2n denotes a partial dispersion ratio of a material of the negative lens element in the second lens group, and vd2n denotes Abbe number of the material of the negative lens element in the second lens group at d-line (wavelength λ=587.6 nm).

20. The method for forming an image of an object and varying a focal length of a zoom lens system according to claim 18, further comprising the step of:
including at least one aspherical surface in the second lens group.

21. The method for forming an image of an object and varying a focal length of a zoom lens system according to claim 18, further comprising steps of:
constructing the first lens group by two lens elements which are, in order from the object along the optical axis, a negative lens element and a positive lens element,
including an aspherical surface in the negative lens element of the first lens group, and
satisfying the following conditional expression:

$$0.55<(vd1n-vd1p)/vd1p<1.2$$

where vd1n denotes Abbe number of a glass material of the negative lens element in the first lens group at d-line (wavelength λ=587.6 nm), and vd1p denotes Abbe number of a glass material of the positive lens element in the first lens group at d-line (wavelength λ=587.6 nm).

* * * * *